US010976542B2

(12) United States Patent
Russo et al.

(10) Patent No.: US 10,976,542 B2
(45) Date of Patent: Apr. 13, 2021

(54) ABERRATION CORRECTION OF OPTICAL PHASED ARRAYS

(71) Applicant: ANALOG PHOTONICS LLC, Boston, MA (US)

(72) Inventors: Peter Nicholas Russo, Somerville, MA (US); Ehsan Hosseini, Milton, MA (US); Christopher Poulton, Cambridge, MA (US); Erman Timurdogan, Somerville, MA (US); Diedrik Vermeulen, Boston, MA (US); Michael Robert Watts, Hingham, MA (US); Michael Whitson, Boston, MA (US)

(73) Assignee: Analog Photonics LLC, Boston, MA (US)

( * ) Notice: Subject to any disclaimer, the term of this patent is extended or adjusted under 35 U.S.C. 154(b) by 94 days.

(21) Appl. No.: 16/260,016

(22) Filed: Jan. 28, 2019

(65) Prior Publication Data

US 2019/0235233 A1     Aug. 1, 2019

Related U.S. Application Data

(60) Provisional application No. 62/622,436, filed on Jan. 26, 2018.

(51) Int. Cl.
*G02B 27/00* (2006.01)

(52) U.S. Cl.
CPC ..... *G02B 27/0068* (2013.01); *G02B 27/0087* (2013.01)

(58) Field of Classification Search
CPC .......... G02B 27/0068; G02B 27/0087
See application file for complete search history.

(56) References Cited

U.S. PATENT DOCUMENTS

| 8,988,754 | B2 * | 3/2015 | Sun | G02B 6/26 359/238 |
| 10,018,851 | B2 * | 7/2018 | Soskind | G02B 27/0037 |
| 2002/0186919 | A1 * | 12/2002 | Pepper | G02F 1/292 385/27 |
| 2003/0016421 | A1 * | 1/2003 | Small | H01J 23/165 398/126 |
| 2015/0043054 | A1 * | 2/2015 | Booth | H01S 3/0057 359/291 |

(Continued)

OTHER PUBLICATIONS

Bisch et al., "Adaptive optics aberration correction for deep direct laser written waveguides in the heating regime", Applied Physics A 125:364, 2019.

(Continued)

*Primary Examiner* — Wen Huang
(74) *Attorney, Agent, or Firm* — Young Basile Hanlon & MacFarlane, P.C.

(57) ABSTRACT

Aspects of the present disclosure describe systems, methods, and structures for aberration correction of optical phased arrays that employ a corrective optical path difference (OPD) in the near-field of an OPA to correct or cancel out aberrations in emitted beams of the OPA including those reaching far-field distances by generating a spatially-varying OPD across the aperture of the OPA that is substantially equal and opposite to an equivalent OPD of the aberration(s).

19 Claims, 31 Drawing Sheets

(56) References Cited

U.S. PATENT DOCUMENTS

2019/0179064 A1* 6/2019 Zhang .................... G01S 17/10

OTHER PUBLICATIONS

Huang et al., "Aberration correction for direct laser written waveguides in a transverse geometry", Optics Express, vol. 24, No. 10, pp. 10565-10574, May 16, 2016.
Kelemen et al., "Parallel photopolymerisation with complex light patterns generated by diffractive optical elements", Optics Express, vol. 15, No. 22, pp. 14488-14497, Oct. 29, 2007.
Mauclair et al., "Ultrafast laser writing of homogeneous longitudinal waveguides in glasses using dynamic wavefront correction", Optics Express, vol. 16, No. 8, pp. 5481-5492, Apr. 14, 2008.
Salter et al., "Femtosecond fiber Bragg grating fabrication with adaptive optics aberration compensation", Optics Letters, vol. 43, No. 24, pp. 5993-5996, Dec. 15, 2018.

* cited by examiner

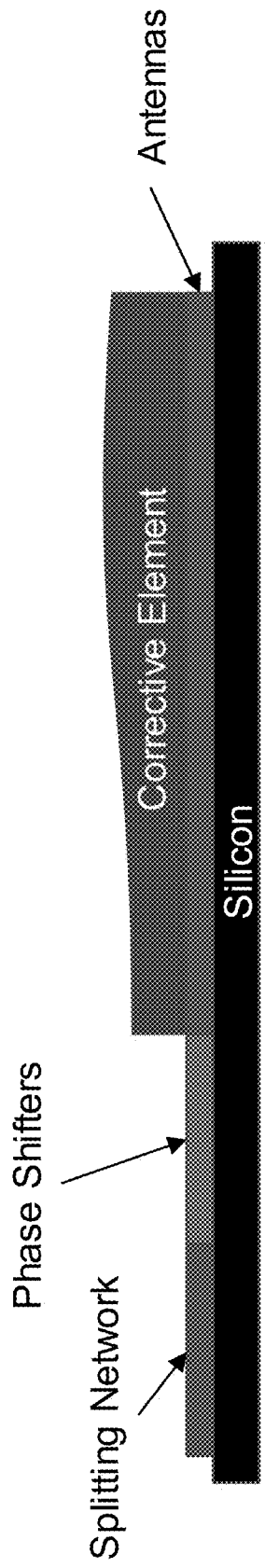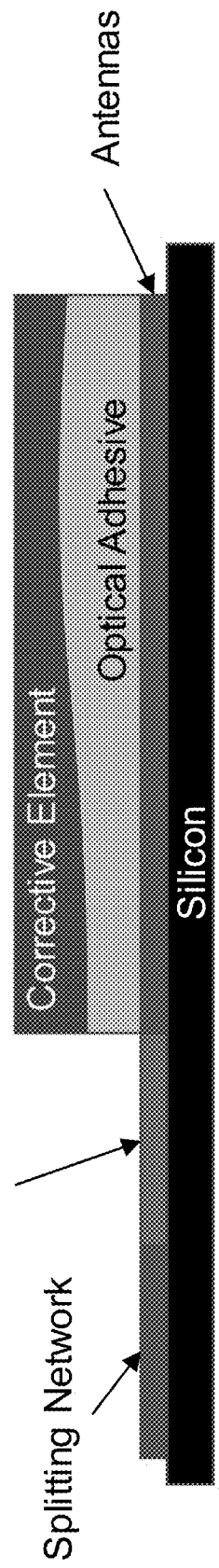
FIG. 3(A)
FIG. 3(B)

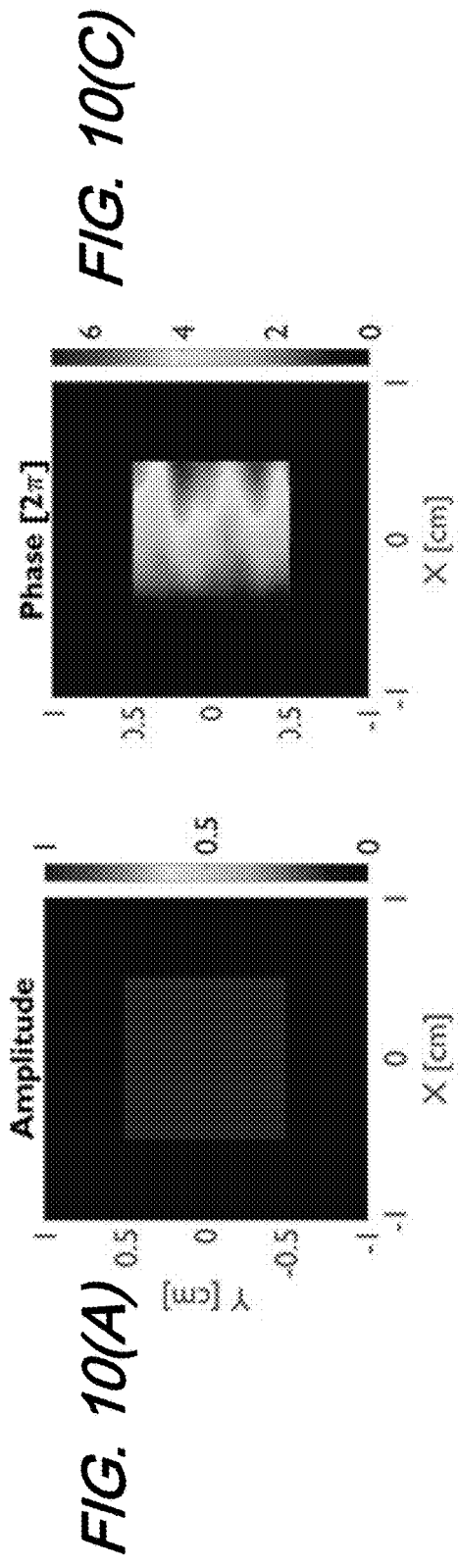
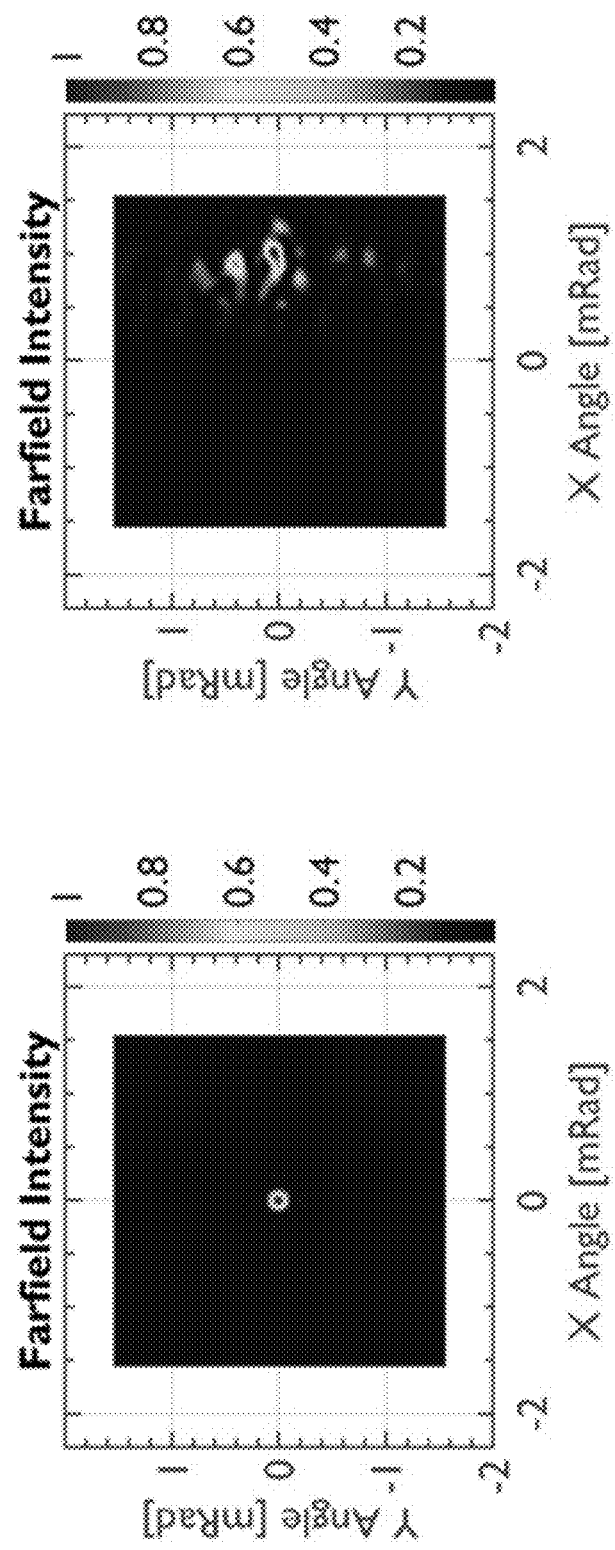
FIG. 10(A) FIG. 10(B) FIG. 10(C) FIG. 10(D)

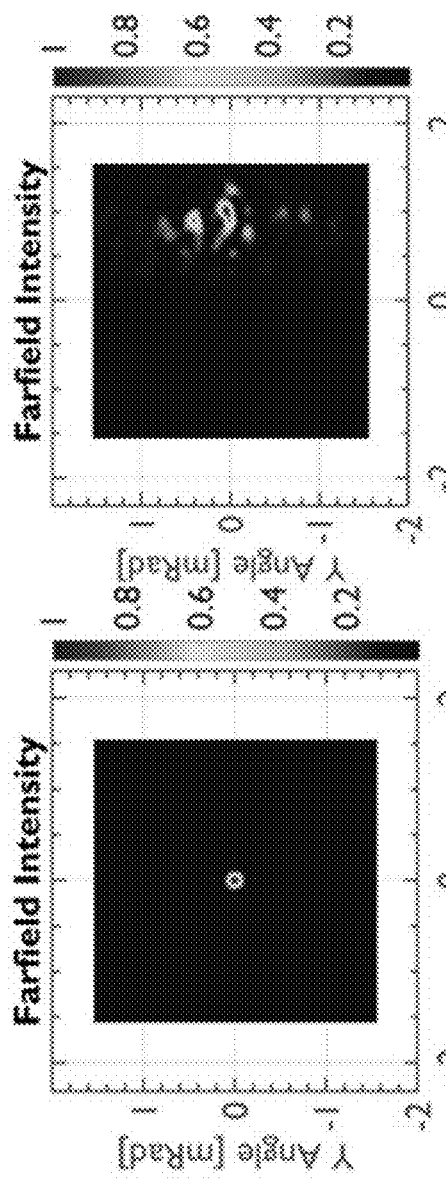
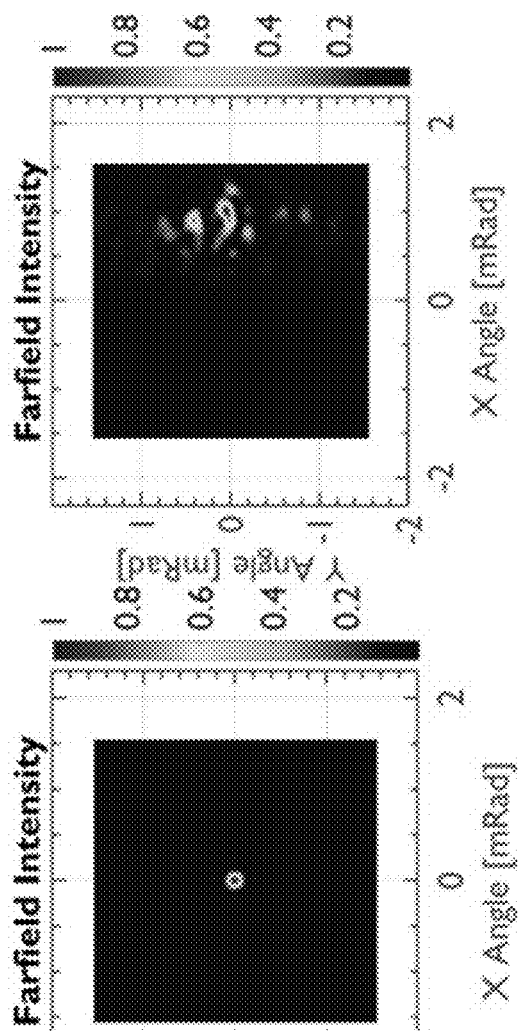
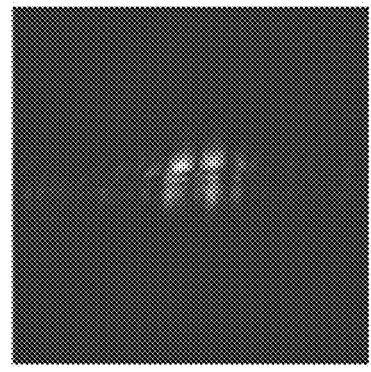
FIG. 11(A) Simulated ideal diffraction-limited far field spot.
FIG. 11(B) Simulated aberrated far field, from sample Si thickness map.
FIG. 11(C) Laboratory imaged far field, from actual aberrated OPA.
Simulated far field speckle pattern shows qualitative similarity with observations.

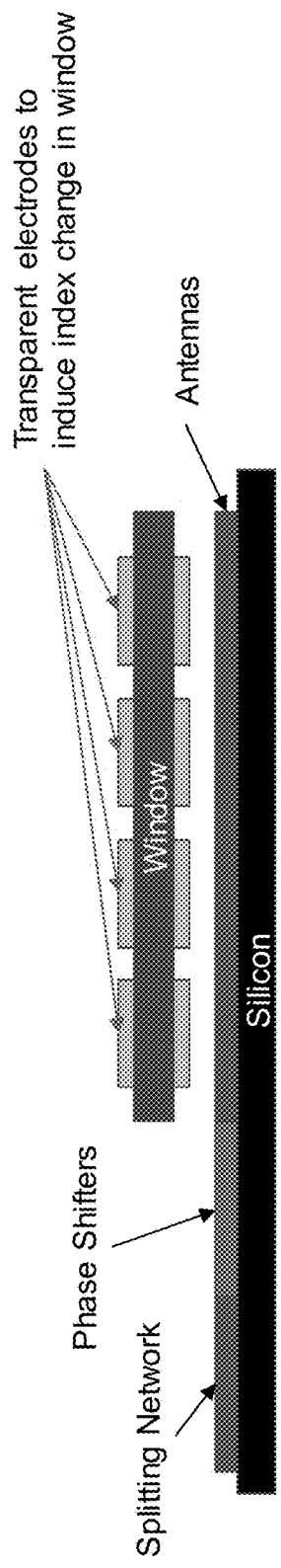
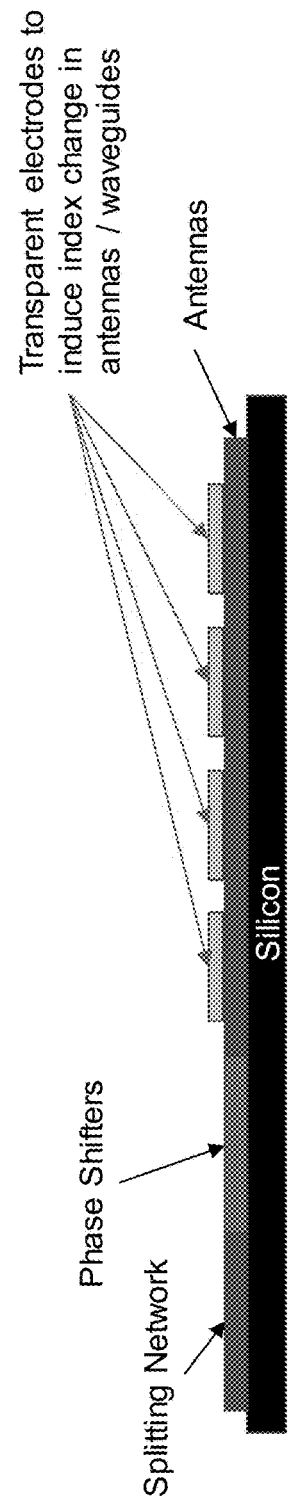
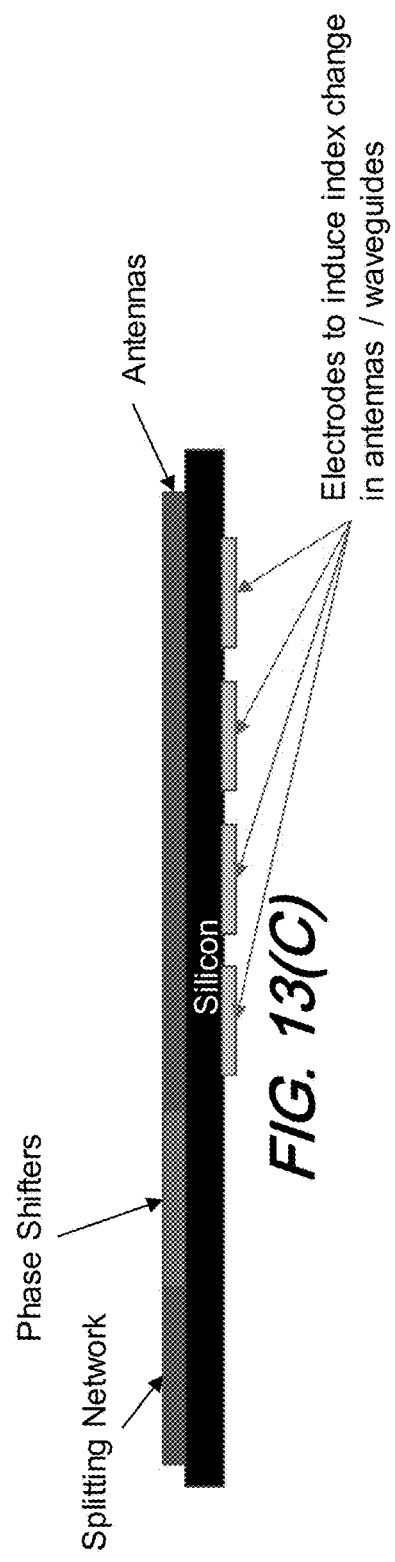
FIG. 13(A)
FIG. 13(B)
FIG. 13(C)

Optimizing Heater Drives

Particle swarm optimization of discrete heaters with FEA-derived ΔT map

Minimizes global RMS phase error: $FOM = \sqrt{\frac{1}{A}\iint \left(\frac{\varphi}{2\pi}\right)^2 dA}$

ABERRATION CORRECTION OF OPTICAL PHASED ARRAYS

CROSS REFERENCE TO RELATED APPLICATIONS

This application claims the benefit of U.S. Provisional Patent Application Ser. No. 62/622,436 filed 26 Jan. 2018 which is incorporated by reference as if set forth at length herein. This application is related to U.S. patent application Ser. No. 15/784,110 by the instant Applicant, the entire contents of which are incorporated by reference as if set forth at length herein.

TECHNICAL FIELD

This disclosure relates generally to optical phased arrays. More particularly it pertains to systems, methods, and structures providing the aberration correction of optical phased arrays.

BACKGROUND

As is known, optical phased arrays (OPAs) have proven useful for transmitting and receiving diffraction limited laser light. As OPAs find utility in applications that transmit and receive laser light over long distances such as free space optical communications and LiDAR however, it becomes difficult to maintain diffraction limited beams due—in part—to environmental and fabrication non-idealities. Accordingly, methods, and structures that provide aberration correction of optical phased arrays would represent a welcome addition to the art.

SUMMARY

An advance in the art is made according to aspects of the present disclosure directed to methods and structures that provide aberration correction in optical phased arrays.

In sharp contrast to the prior art—systems, methods, and structures according to the present disclosure employ a corrective optical path difference (OPD) in the near-field of an OPA to correct or cancel out aberrations in emitted beams of the OPA. As will become appreciated by those skilled in the art, systems, methods, and structures according to aspects of the present disclosure generate a spatially-varying OPD across the aperture of the OPA that is substantially equal and opposite to an equivalent OPD of the aberration(s).

BRIEF DESCRIPTION OF THE DRAWING

A more complete understanding of the present disclosure may be realized by reference to the accompanying drawing in which:

FIG. 3(A) is a schematic diagram showing an illustrative OPA structure including a corrective element with varying thickness disposed upon a top surface of the structure to correct for OPA aberrations according to aspects of the present disclosure;

FIG. 3(B) is a schematic diagram showing an illustrative OPA structure including a corrective element with varying thickness disposed upon a top surface of the structure with an adhesive having a determined index to correct for OPA aberrations and corrective element errors according to aspects of the present disclosure;

FIG. 9(A), FIG. 9(B), FIG. 9(C), and FIG. 9(D) are a series of plots illustrating error interrelationships across an illustrative OPA wherein: FIG. 9(A) illustrates error in thickness, FIG. 9(B) illustrates error in index, FIG. 9(C) illustrates error in phase, and FIG. 9(D) illustrates resulting far field intensity from the cumulative error(s) according to aspects of the present disclosure;

FIG. 10(A), FIG. 10(B), FIG. 10(C), and FIG. 10(D) is a series of plots illustrating: FIG. 10(A) amplitude; FIG. 10(B) far-field intensity of a perfect, diffraction limited aperture; and FIG. 10(C) phase ($2\pi$), and FIG. 10(D) far-field intensity of illustrative aberrated OPA operation according to aspects of the present disclosure;

FIG. 11(A), FIG. 11(B), and FIG. 11(C) is a series of plots illustrating a simulated far field intensity speckle pattern showing qualitative similarity in which: FIG. 11(A) shows the far field intensity for a simulated ideal diffraction-limited far field spot; FIG. 11(B) shows the far field intensity for a simulated aberrated far field from sample Si thickness map; and FIG. 11(C) shows the laboratory imaged far field from an actual aberrated OPA aberrated OPA according to aspects of the present disclosure;

FIG. 13(A) is a schematic diagram showing an illustrative OPA structure including tunable auxiliary element positioned above the OPA structure to correct for OPA aberrations according to aspects of the present disclosure;

FIG. 13(B) is a schematic diagram showing an illustrative OPA structure including tunable transparent electrode elements positioned upon the OPA structure to correct for OPA aberrations according to aspects of the present disclosure;

FIG. 13(C) is a schematic diagram showing an illustrative OPA structure including tunable electrode elements positioned upon a non-antenna side of the OPA structure to correct for OPA aberrations according to aspects of the present disclosure;

DESCRIPTION

Figure 1:
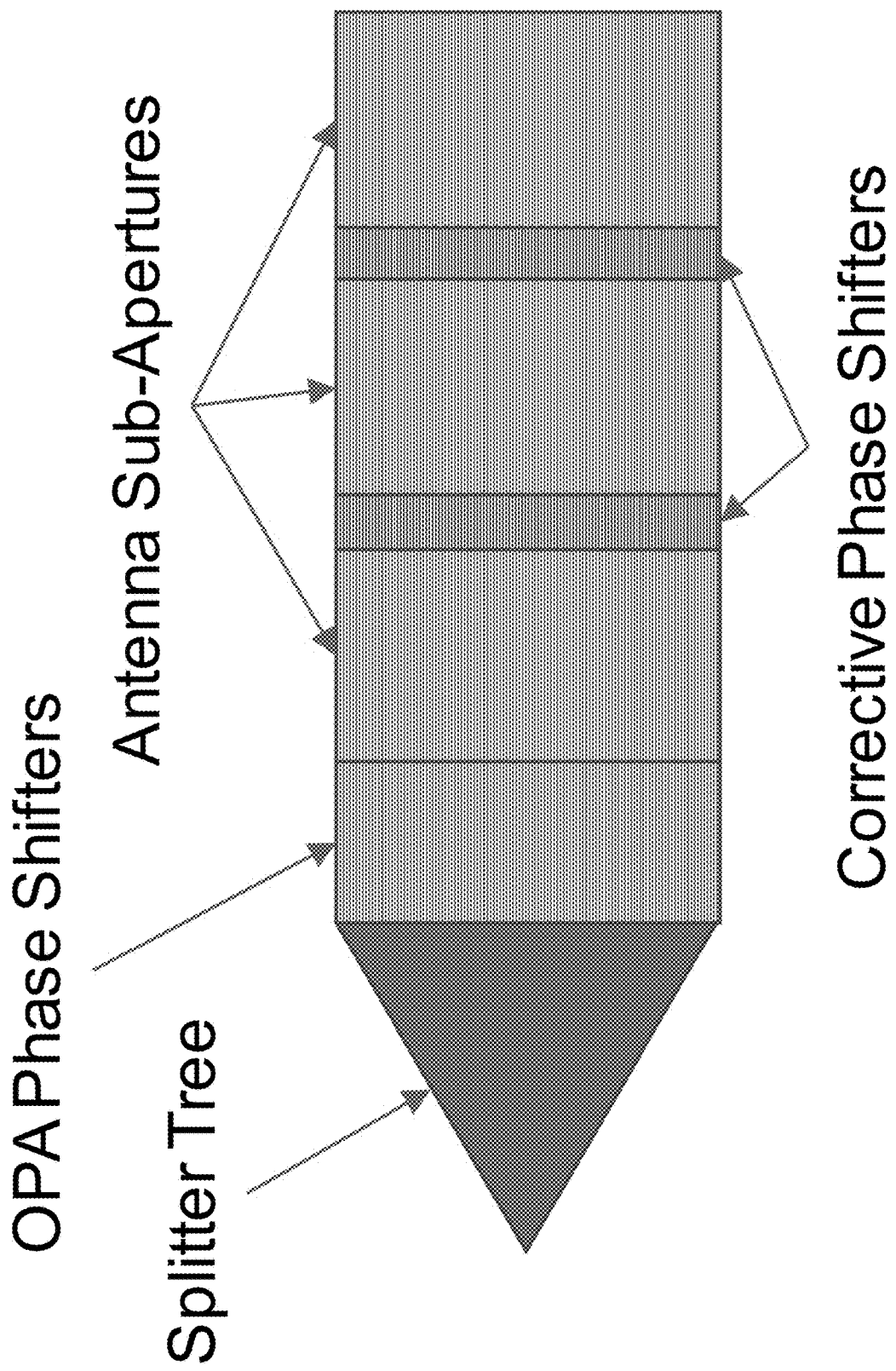
FIG. 1 is a schematic diagram showing an illustrative optical phased array (OPA) structure including aberration correction phase shifters for antenna sub-apertures according to according to aspects of the present disclosure.

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor(s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGS. comprising the drawing are not drawn to scale.

By way of some additional background, it is noted that optical phased arrays have generally found more widespread utilization involving small aperture sizes (i.e., mm-scale or less). As noted previously, some particularly attractive applications for OPAs involves the transmission/reception of light over long distances—such applications including free space optical communications and LiDAR. These long-distance applications utilize centimeter-scale OPAs.

As the size of an OPA increases, it is more difficult to maintain diffraction-limited transmit/receive light beams due to environmental conditions and fabrication non-idealities. More particularly, variation(s) in wafer properties onto which OPAs are fabricated due to fabrication errors or other wafer anomalies can cause light to propagate at different rates through different waveguides or different portions of a same waveguide—even though such waveguides are intended/designed to be identical.

Given these problems, aspects of the present disclosure are directed to methods and structures that employ corrective optical path differences (OPD) in the near-field of an OPA to correct or otherwise cancel out aberrations in the far-field beam of the OPA. Generally, such methods and structures according to aspects of the present disclosure generate a spatially-varying optical path difference across the aperture of the OPA that is equal and opposite to an equivalent OPD of the aberration(s). As we shall show and describe, OPA aberration correction according to aspects of the present disclosure may be categorized into three (3) broad categories including: 1) Static corrections applied directly to the OPA; 2) Static corrections applied as an auxiliary element; and 3) Tunable Corrections. Note that according to the present disclosure the correction may be either a phase correction of the emitted light (referred to herein as the phase correction) or the index correction of the propagating waveguide (referred to herein as the index correction).

Static Corrections Applied Directly to the OPA

Static aberrations in the OPA can be corrected in the OPA itself using additional processing steps to cancel the aberration. We identify several examples of corrections that can be applied to the optical phased array itself including:

Changing the chemical composition of the antennas or waveguides;

Changing the index of refraction of the antennas or waveguides or materials surrounding the antennas and waveguides (e.g. ion implantation);

Altering the cladding of the waveguides to change the OPD;

Changing the mechanical properties of the antennas or waveguides, i.e., dimensions or stress);

Modifying the thickness of existing material that is in the path of light emitted from antennas on the OPA or in the path of light collected by the OPA;

Depositing new material on the OPA aperture to change the OPA;

Trimming fixed phase shifters that break up the emission aperture into sub-apertures;

Designing the position of the fixed emitters in design to account for known aberrations due to fabrication; and Combinations of the above approaches Static Corrections Applied as an Auxiliary Element Static aberrations in the OPA can be corrected with an external element that is placed sufficiently close to the aperture of the OPA. Advantageously, such external elements could exclusively serve the purpose of an aberration correction element, or could serve additional purposes, such as an environmental seal/window, or as an interposer to provide electrical or optical connections to auxiliary system components. According to the present disclosure, such elements used to correct aberrations may advantageously include:

Diffractive optical elements/phase plates with phase varying across the aperture;

Glass or plastic elements with thickness varying across the aperture;

Optical adhesives deposited with varying thickness;

Glass, plastic, or adhesives with index of refraction varying across the aperture to change the effective OPD;

Using fixed stress gradients, temperature gradients, acoustic fields, electric fields, or magnetic fields to change the index of refraction of a material across the OPA aperture; and Combinations of the above approaches.

Tunable Corrections

Of particular advantage—according to aspects of the present disclosure—aberrations can be corrected by employing tunable corrective elements. Such tunable corrective elements advantageously may be embedded in the OPA itself or can be an external element to the OPA. One advantage of tunable corrections is that they can be employed once the aperture is in operation and optimize each device individually at all times.

Illustrative elements embedded in the OPA may include:

Tunable phase shifters in between sub-apertures of the OPA;

Heaters designed to cause temperature gradients across the OPA;

Applying electric or acoustic fields to the individual antennas or waveguides with transducers or electrodes to trim any OPD across the OPA that may include a material within the cladding of the waveguide that interacts with the evanescent field of the guided mode that is tunable such as a polymer or liquid crystal Illustrative elements external to the OPA may include:

Liquid crystals in the path of the out-of-plane light emission (or received light);

Windows that are actively heated and/or cooled to cause a time- and spatially-varying OPD using the thermo-optic effect; and Windows with electrodes embedded to induce OPD differences using the electro-optic or magneto-optic effect; and Deformable mirrors.

While the above approaches comprise a principal focus of our disclosure, additional OPA aberration correction methods and structures according to the present disclosure are contemplated and may include: 1) Elimination of waveguide width variations through the use of slab emitter(s); 2) Structured compensation; and 3) Local characterization of optical layers.

Elimination of Waveguide Width Variations using a Slab Emitter

As noted, one contributor to beam aberrations are antenna width variations. One approach to correct for OPA aberration resulting from such width variations involves eliminating antenna waveguides and instead emitting into a relatively very wide antenna waveguide which we may illustratively call a slab antenna. Since during fabrication of such structure there is generally no critical lithography performed in the emitter region variations in waveguide widths—for example—are eliminated as sources of aberrations in beams transmitted from the OPA including such slab antennae.

Structured Compensation

When the variations in the geometrical parameters of the OPA are deterministic, according to the present disclosure there exists a possibility to correct for aberrations at the mask level, e.g. change the waveguide width of the antenna's or grating pitch as a function of position. Furthermore, when these variations are deterministic on a subset of reticles of the wafer, different mask sets can be used for different reticles on the wafer to correct for aberrations.

Local Characterization of Optical Layers

As noted previously, OPA aberrations may result from variations in thicknesses and widths of photonic elements comprising the OPA. In order to measure the thickness and width variations of these photonic elements in a layer—according to aspects of the present disclosure—an optical resonator can be added at several locations along the antennae. By measuring the resonance frequency information about layer thicknesses and widths can be determined. Advantageously, when such a resonator is optically probed for two orthogonal resonant modes such as the TE and TM modes, both the thickness and width of the resonator can be determined. Illustrative examples of such resonators include a micro-disk type resonator. By positioning these devices along the antennae length, the width/height/refractive index of the optical layers including the antennae may be characterized and used to effect correction mechanisms Such characterization measurements may advantageously be automated on a wafer-scale when—for example—coupling a fiber grating coupler into test structures during manufacture.

Other more "standard methods" such as reflectometry, cross sections, SEM, ellipsometry, etc., may also be used according to the present disclosure. Moreover—and as we shall describe—the antennae themselves can be used as a feedback mechanism by examining an optical far-field pattern resulting from OPA emission and adjusting any aberration correction/compensation mechanism(s) employed.

Turning now to FIG. 1, there is shown a schematic a schematic diagram of an illustrative optical phased array (OPA) structure including aberration correction phase shifters for antenna sub-apertures according to according to aspects of the present disclosure. While not specifically shown in this figure, those skilled in the art will readily understand and appreciate that such an OPA generally receives as optical input, light output from an optical source such as a laser (not specifically shown) that is subsequently split and distributed through the effect of a splitter tree or other optical distribution network. Light traversing the "leaves" of the splitter tree are selectively phase shifted through the effect of a plurality of phase shifters—one or more for each leaf—and the phase shifted light is input to the OPA for transmission and subsequent reception via an array of antennae.

According to the present disclosure—and as schematically shown in the figure, the overall OPA aperture is divided into a plurality of sub-apertures, each separated from one another by corrective phase shifters included in the OPA antennae structure. In this inventive manner, each one of the individual sub-apertures may be tuned by one or more of the corrective phase shifters within the OPA thereby providing aberration correction to light emitted by one or more of the sub-apertures affected by the respective corrective phase shifters.

Figure 2:
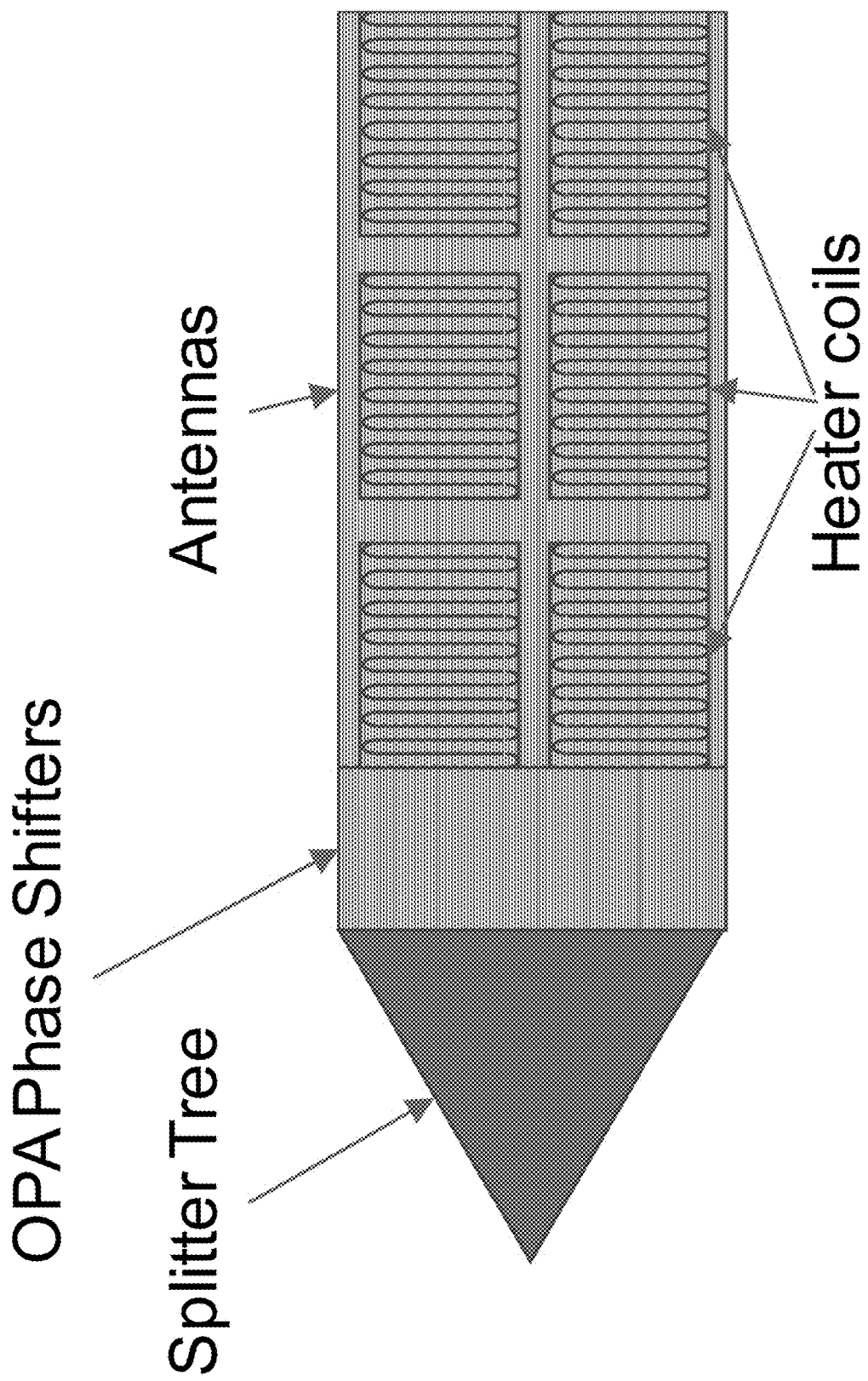
FIG. 2 is a schematic diagram showing an illustrative OPA structure including temperature control elements (heaters and/or coolers) allowing for time-varying correction of OPA aberrations according to aspects of the present disclosure.

FIG. 2 is a schematic diagram showing an illustrative OPA structure including temperature control elements (heaters and/or coolers) allowing for time-varying correction of OPA aberrations according to aspects of the present disclosure. As shown illustratively in this figure, a plurality of heater coils are shown (illustratively shown although cooling structures may likewise be employed) underlying the antennae of the OPA. Such heater coils may be configured to underlie a particular section or number of antennae comprising the OPA. Operationally, each of the antennae groupings overlying a heater coil constitute a tunable sub-aperture as their aberration(s) may be affected by the underlying heater coil. Similarly, any antennae group located in an area not overlying a heater would likewise be a sub-aperture.

FIG. 3(A) is a schematic diagram showing a cross-section of an illustrative OPA structure including a corrective element with varying thickness disposed upon a top surface of the structure to correct for OPA aberrations according to aspects of the present disclosure. As shown in this figure, a corrective element is shown (top) overlying the antennae of an entire aperture of the OPA. The corrective element—which may be selected from a suitable material exhibiting an appropriate index—is configured (shaped) to correct for aberrations exhibited by the OPA. As shown in this figure, a top surface of the corrective element is not necessarily—and may not be—parallel to a top surface of the OPA and its antennae.

FIG. 3(B) is a schematic diagram showing an illustrative OPA structure including a corrective element with varying thickness disposed upon a top surface of the structure with an adhesive having a determined index to correct for OPA aberrations and corrective element errors according to aspects of the present disclosure. As shown, the corrective element however and the adhesive collectively provide a corrective prescription to compensate for any aberrations in the OPA.

Figure 4:
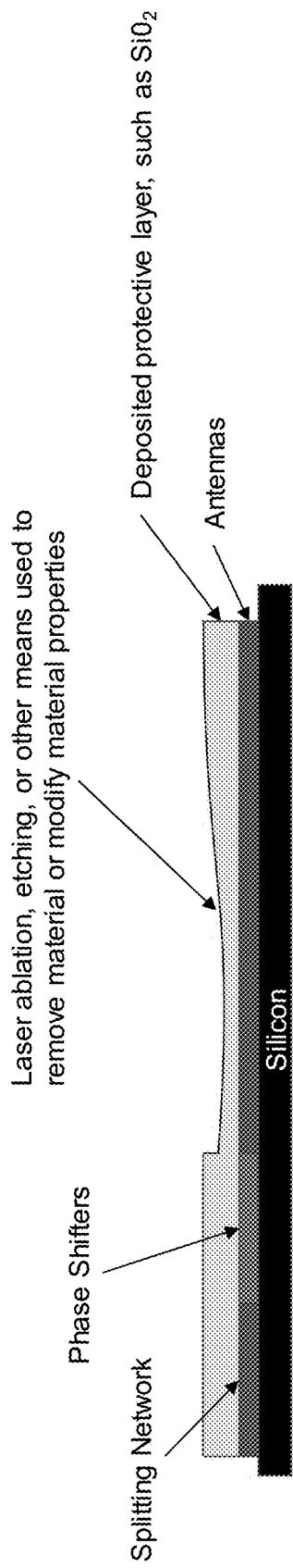
FIG. 4 is a schematic diagram showing an illustrative OPA structure including a protective layer element exhibiting a corrective shape to correct for OPA aberrations according to aspects of the present disclosure.

FIG. 4 is a schematic diagram showing an illustrative OPA structure including a protective layer element exhibiting a corrective shape to correct for OPA aberrations according to aspects of the present disclosure. As shown, a deposited protective layer such as Silicon Dioxide, overlies the OPA including the antennae. The deposited layer overlying the antennae may be subsequently shaped by selective removal of the deposited material such that a corrective prescription to compensate for aberrations in the OPA. Such material removal may be performed by—for example—laser ablation or chemical etch or other mechanisms including mechanical. Note further that changes in overlying material composition by—for example—chemical treatment may be performed to effect the corrective prescription.

At this point we note that in determining the amount and particular portion(s) of the OPA overall aperture which to apply aberration correction, we may determine such by testing emission performance in the far-field of the OPA or—alternatively—determining necessary prescription from measurements made on the OPA itself. For example, measured variations in waveguide dimensions comprising the OPA—and the antennae portions in particular—may be used to determine the prescription to be applied and what material(s), specific shape(s), and location(s) of same on the antennae region(s) of the OPA. With such determination, corrective material(s), adhesive(s), and shape(s) may be applied and/or formed as appropriate. Alternatively, such far-field emissions may be used to dynamically and correctively tune the OPA by adjusting any heaters and/or phase shifters employed in particular sub-apertures as shown and described previously.

Figure 5:
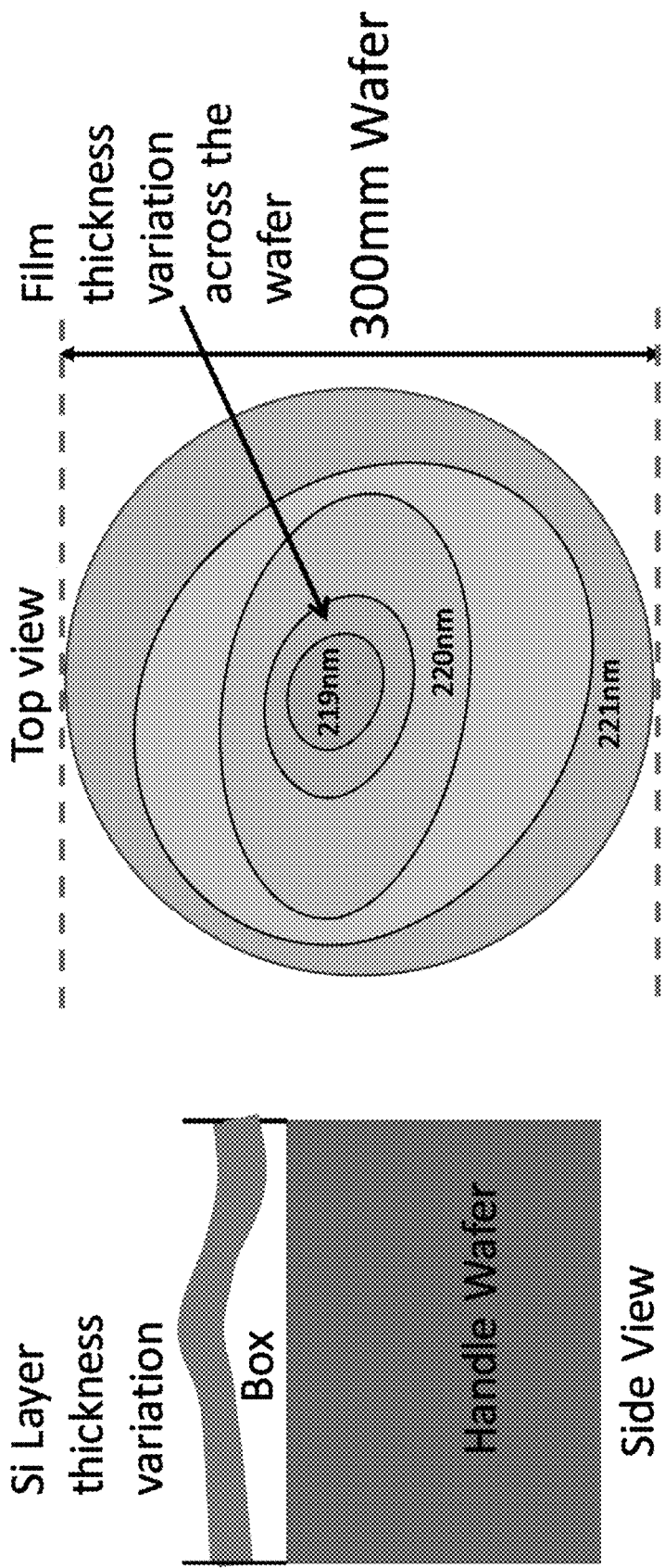
FIG. 5 is a schematic diagram showing an illustrative side and top views of a silicon photonic structure and film thickness variation(s) across a wafer including such structure according to aspects of the present disclosure.

FIG. 5 is a schematic diagram showing an illustrative side view of a silicon photonic structure and film thickness variation(s) across a wafer including such structure according to aspects of the present disclosure. As will be understood by those skilled in the art, such photonic structure may comprise an OPA or portion(s) thereof. As shown, a cross sectional thickness variation is illustrated along with a top view illustrating thickness variation(s) across a 300 mm wafer which may include many individual OPA chips. Such thickness variation measurement data may advantageously be used to determine corrective prescriptions for the OPA chips and their antennae elements according to aspects of the present disclosure.

Figure 6:
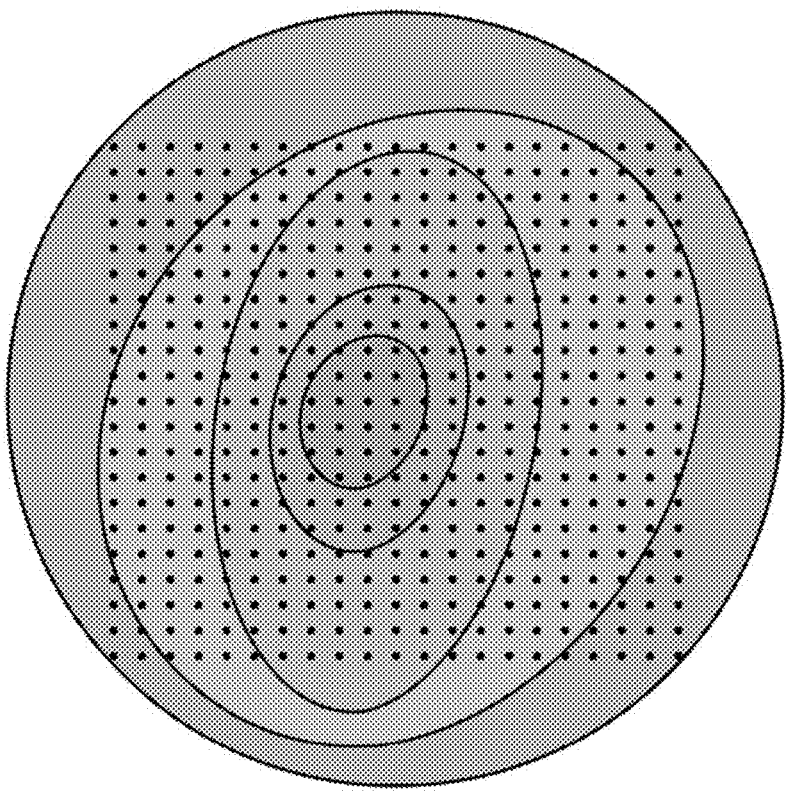
FIG. 6 is a schematic diagram showing an illustrative high-resolution measurement of thickness across the wafer of FIG. 6 according to aspects of the present disclosure.

FIG. 6 is a schematic diagram showing an illustrative high-resolution measurement of thickness across the wafer of FIG. 6 according to aspects of the present disclosure. As will be readily understood by those skilled in the art, contemporary measurement techniques permit very high-resolution thickness measurement across a wafer, providing data sufficient to determine an appropriate prescription for a given OPA.

Figure 7:
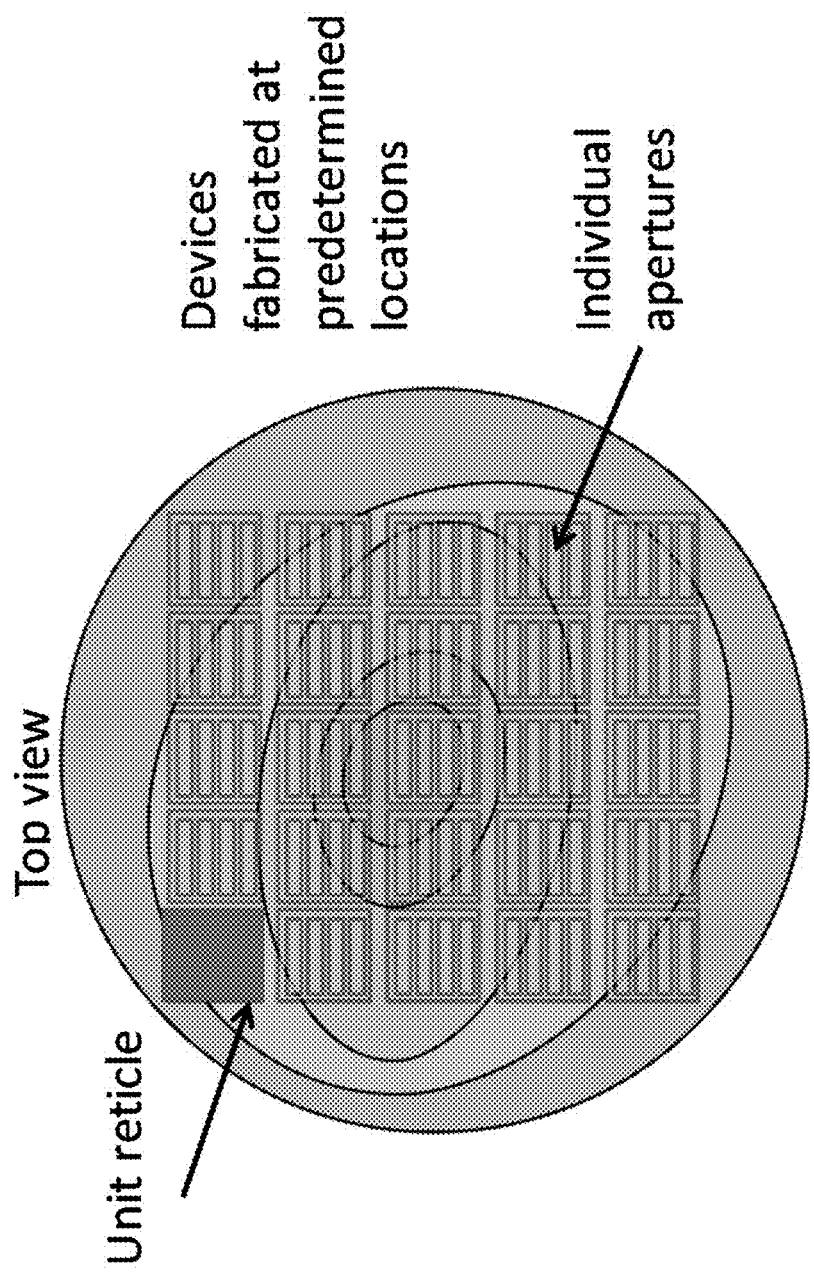
FIG. 7 is a schematic diagram showing an illustrative wafer including a plurality of OPA chips fabricated thereon relative to wafer thickness variations according to aspects of the present disclosure.

FIG. 7 is a schematic diagram showing an illustrative wafer including a plurality of OPA chips fabricated thereon relative to wafer thickness variations according to aspects of the present disclosure. As shown in the figure, a wafer including a plurality of individual device (OPAs—unit reticle) chips each including individual apertures are shown relative to the top view shown in FIG. 6. As will be understood by those skilled in the art, by determining the silicon wafer cross-sectional thicknesses across its diameter, one may advantageously register the unit reticle(s) such that they are fabricated on a particular thickness profile. In this manner, individual chips may be fabricated such that one or more corrective prescriptions are known in advance of their individual fabrication.

Figure 8:
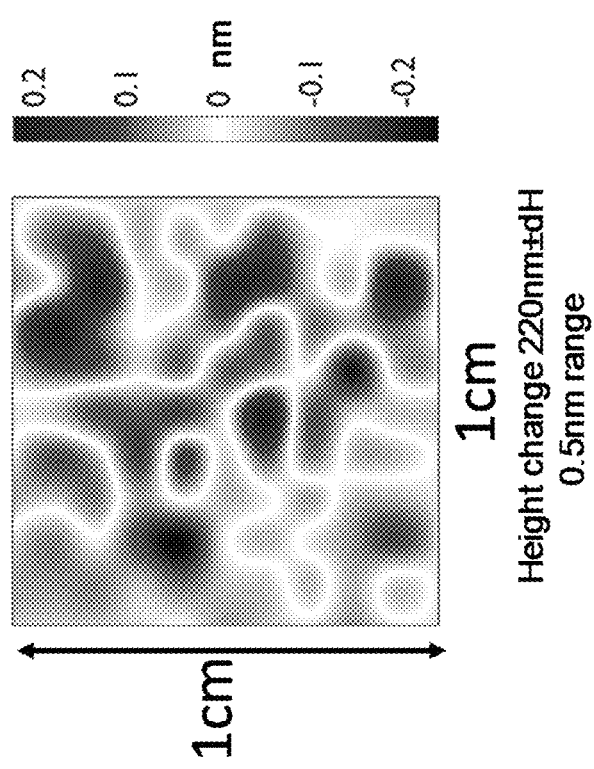
FIG. 8 is a plot illustrating a typical OPA aperture size and thickness variations across its aperture according to aspects of the present disclosure.

FIG. 8 is a plot illustrating a typical OPA aperture size and thickness variations across its aperture according to aspects of the present disclosure. As shown in this figure, a 1 cm×1 cm aperture will exhibit a number of thickness variations across its emission area.

Figures 9A, 9B, 9C, 9D:
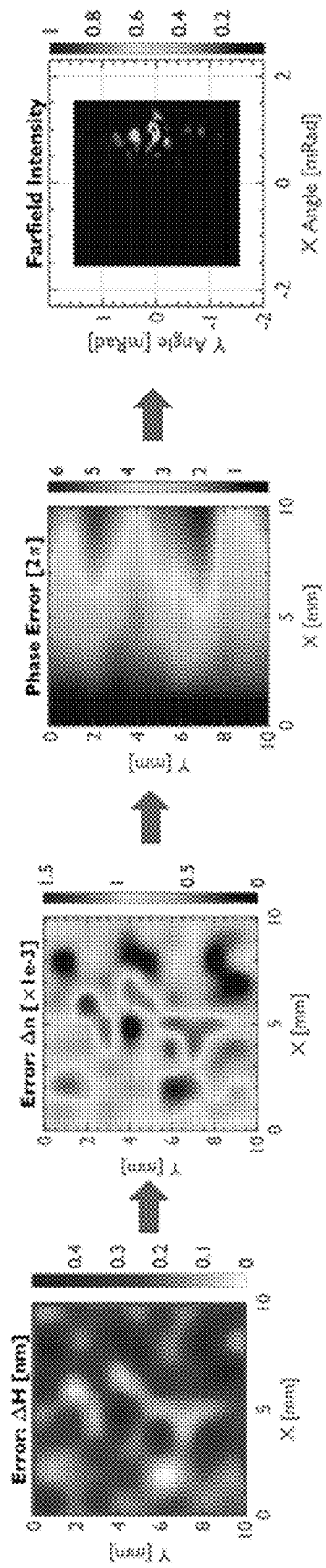

FIG. 9(A), FIG. 9(B), FIG. 9(C), and FIG. 9(D) are a series of plots illustrating error interrelationships across an illustrative OPA wherein: FIG. 9(A) illustrates error in thickness, FIG. 9(B) illustrates error in index, FIG. 9(C)

illustrates error in phase, and FIG. 9(D) illustrates resulting far field intensity from the cumulative error(s) according to aspects of the present disclosure. By inspecting this figure, those skilled in the art will appreciate and understand that thickness variations in Si effectively produce accumulated phase error(s) causing beam tilt(s) and speckle. Of note, because the light travels along the waveguide prior to emission via antennae, the phase pattern is similar to the integral of the thickness variation.

FIG. 10(A), FIG. 10(B), FIG. 10(C), and FIG. 10(D) is a series of plots illustrating: FIG. 10(A) amplitude; FIG. 10(B) far-field intensity of a perfect, diffraction limited aperture; and FIG. 10(C) phase ($2\pi$), and FIG. 10(D) far-field intensity of illustrative aberrated OPA operation according to aspects of the present disclosure;

FIG. 11(A), FIG. 11(B), and FIG. 11(C) is a series of plots illustrating a simulated far field intensity speckle pattern showing qualitative similarity in which: FIG. 11(A) shows the far field intensity for a simulated ideal diffraction-limited far field spot; FIG. 11(B) shows the far field intensity for a simulated aberrated far field from sample Si thickness map; and FIG. 11(C) shows the laboratory imaged far field from an actual aberrated OPA aberrated OPA according to aspects of the present disclosure. As may be observed from this figure, a simulated far field speckle pattern shows a qualitative similarity with observations made in the laboratory with an actual, aberrated OPA.

Figure 12:
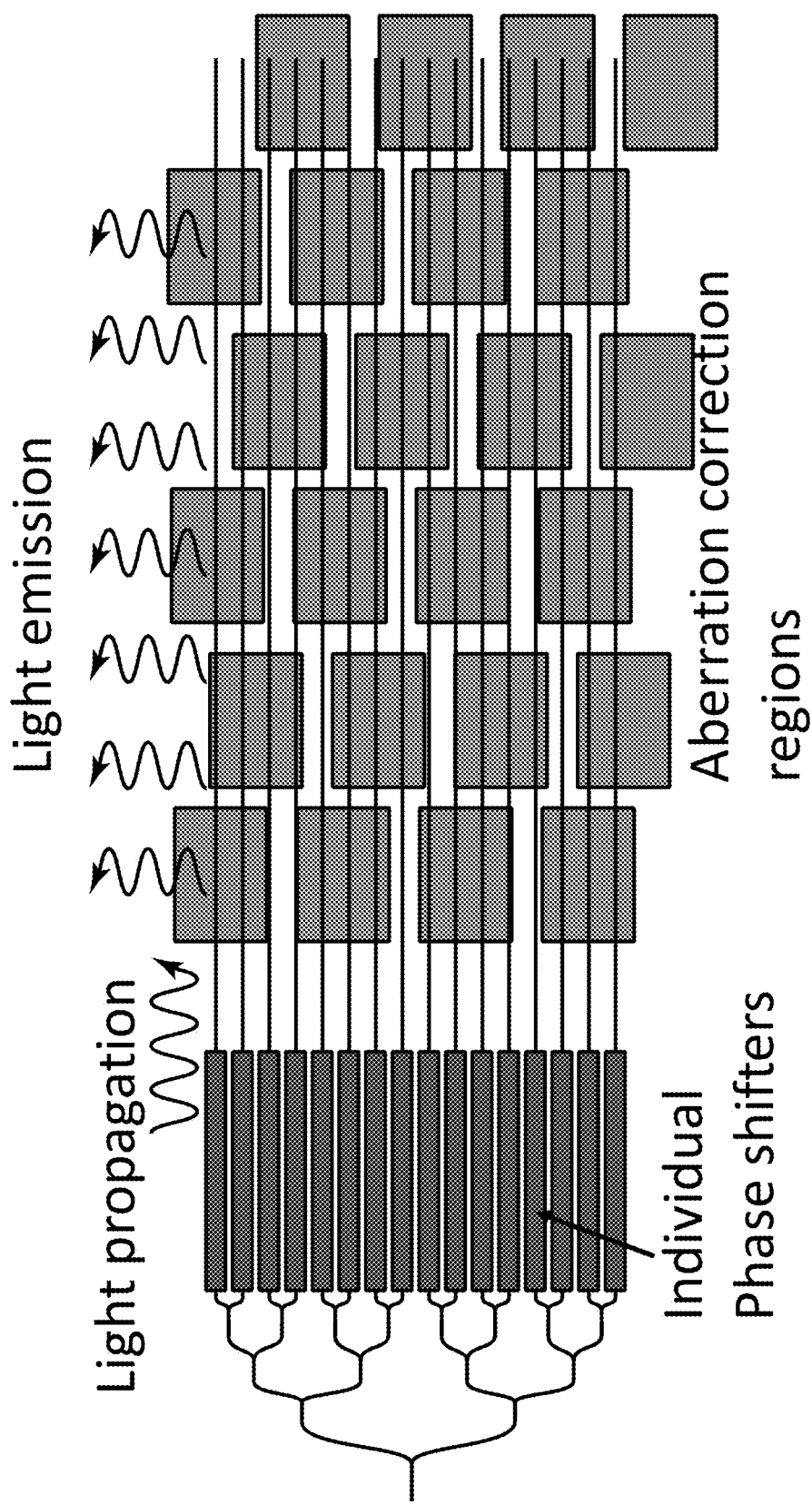
FIG. 12 is a schematic diagram showing an illustrative OPA structure including aberration correction regions and light propagation therefrom according to aspects of the present disclosure.

FIG. 12 is a schematic diagram showing an illustrative OPA structure including aberration correction regions and light propagation therefrom according to aspects of the present disclosure. As may be observed from this figure, the OPA structure shown includes the familiar optical distribution network that optically connects a light source (not shown) to a plurality of phase shifters which in turn are optically connected to individual respective waveguides that are shown including a number of emitting antennae each. Shown further are a plurality of aberration correction regions that may include correction structures such as those shown and described previously including corrective heating elements, corrective cooling elements, and corrective phase shifters. The configuration and placement of the corrective elements define the aberration correction regions. As those skilled in the art will appreciate, by operating the particular elements included in a particular correction region, aberration correction in that region (or others) may be realized.

FIG. 13(A) is a schematic diagram showing an illustrative OPA structure including tunable auxiliary element positioned above the OPA structure to correct for OPA aberrations according to aspects of the present disclosure. As shown in the figure, the auxiliary element includes an electro-active window structure having a number of transparent electrodes that when activated induce an index change in the window. Accordingly, by selectively activating the electrodes a corrective prescription may be applied to light emitted from OPA antennae associated with the activated electrodes.

FIG. 13(B) is a schematic diagram showing an illustrative OPA structure including tunable transparent electrode elements positioned upon the OPA structure to correct for OPA aberrations according to aspects of the present disclosure. Similar to that shown in FIG. 13(A) above, the transparent electrodes when activated induce an index change in the antennae/waveguides of the OPA that are associated with the activated electrode(s).

FIG. 13(C) is a schematic diagram showing an illustrative OPA structure including tunable electrode elements positioned upon a non-antenna side of the OPA structure to correct for OPA aberrations according to aspects of the present disclosure. In the illustrative OPA structure shown in this figure, the electrodes are positioned on a surface opposite that of the antennae. In other words, if the antennae are on a top surface, the electrodes are position on a bottom surface. Operationally, the electrodes will induce an index change in the antennae/waveguides associated with the operated electrodes thereby providing aberration correction to those antennae/waveguides.

Figure 14:
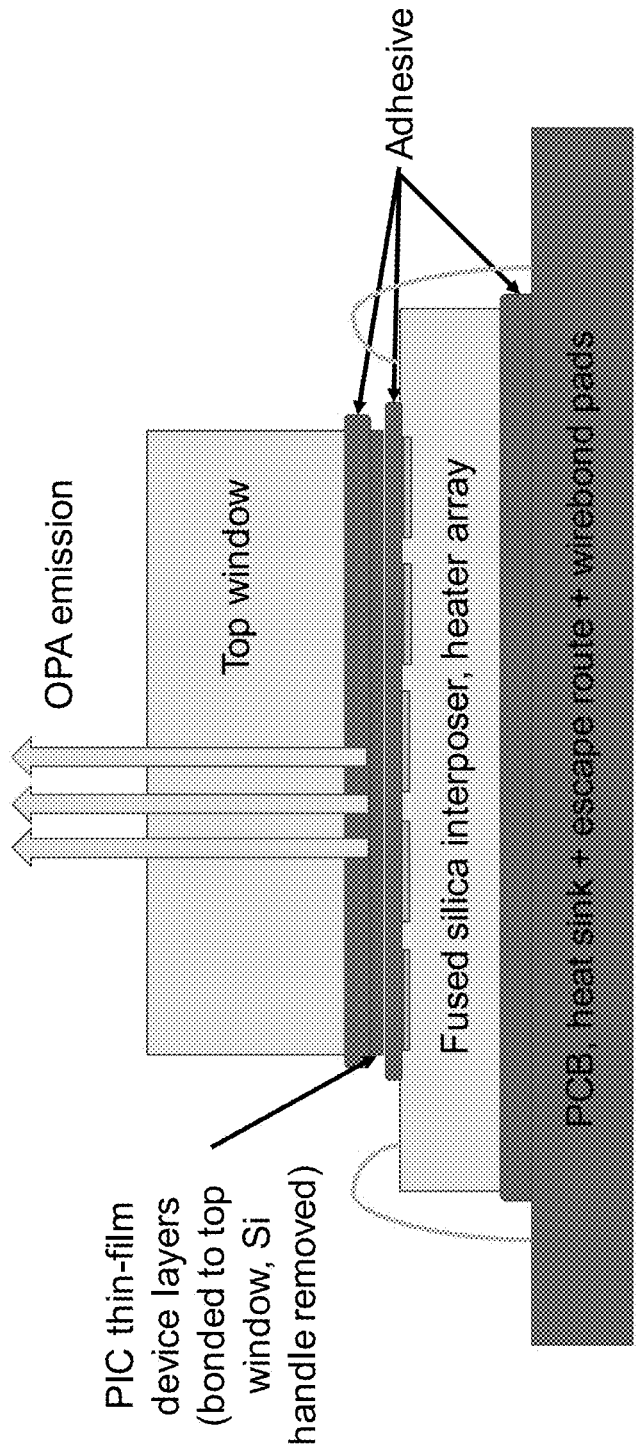
FIG. 14 is schematic diagram showing an illustrative OPA structure including an external heater assembly to correct for OPA aberrations according to aspects of the present disclosure.

FIG. 14 is schematic diagram showing an illustrative OPA structure including an external heater assembly to correct for OPA aberrations according to aspects of the present disclosure. As shown in this figure, a photonic integrated circuit (PIC) including an OPA underlies a window and is shown adhered to that window by a suitable adhesive. Light emitted from the OPA antennae (not specifically shown) will pass through the window and emitted. Shown underlying the PIC is a fused silica interposer including a heater array, the interposer attached to the PIC with a suitable adhesive. This combined structure is in turn mounted upon a printed circuit board including a heat sink and wirebond pads. As with the previously described structures, selective operation of the heater array effects aberration correction in the PIC OPA.

Figure 15:
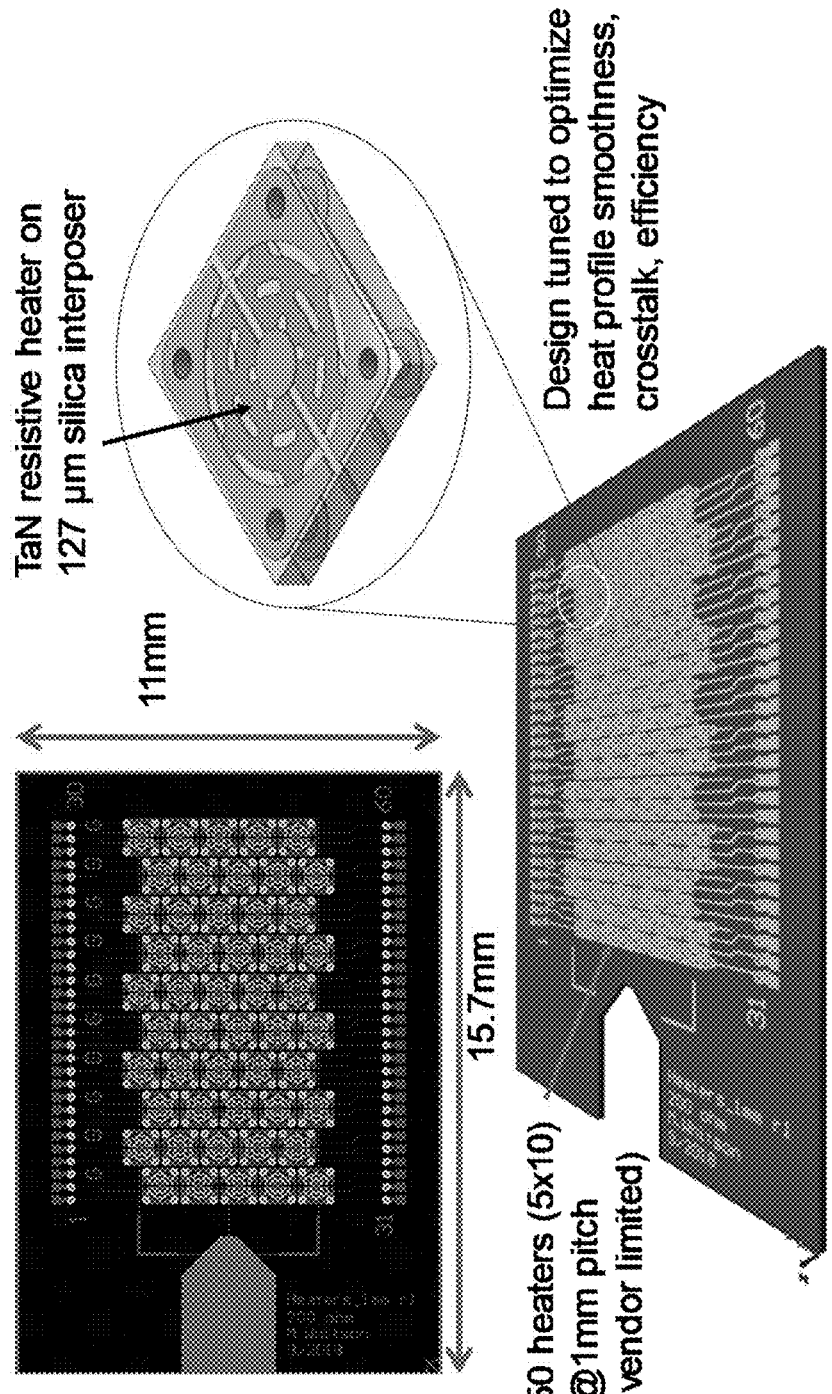
FIG. 15 is schematic diagram showing an illustrative heater array submount layout and illustrative heater (exploded) for an OPA structure including an external heater assembly to correct for OPA aberrations according to aspects of the present disclosure.
Figure 16A:
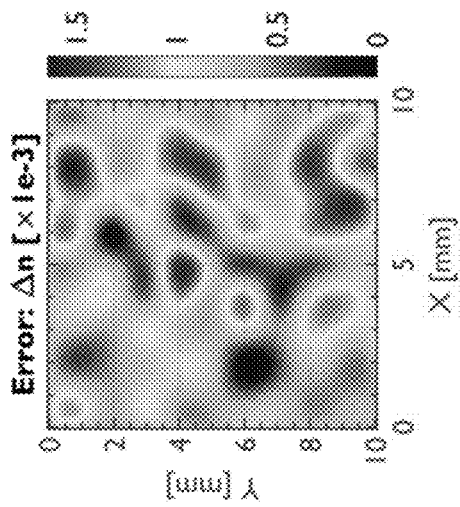
FIG. 16(A), FIG. 16(B), FIG. 16(C), FIG. 16(D), FIG. 16(E), and FIG. 16(F) are a series of plots showing illustrative heater drive optimization utilizing particle swarm optimization of discrete heaters with FEA-derived ΔT map according to aspects of the present disclosure.
Figure 16B:
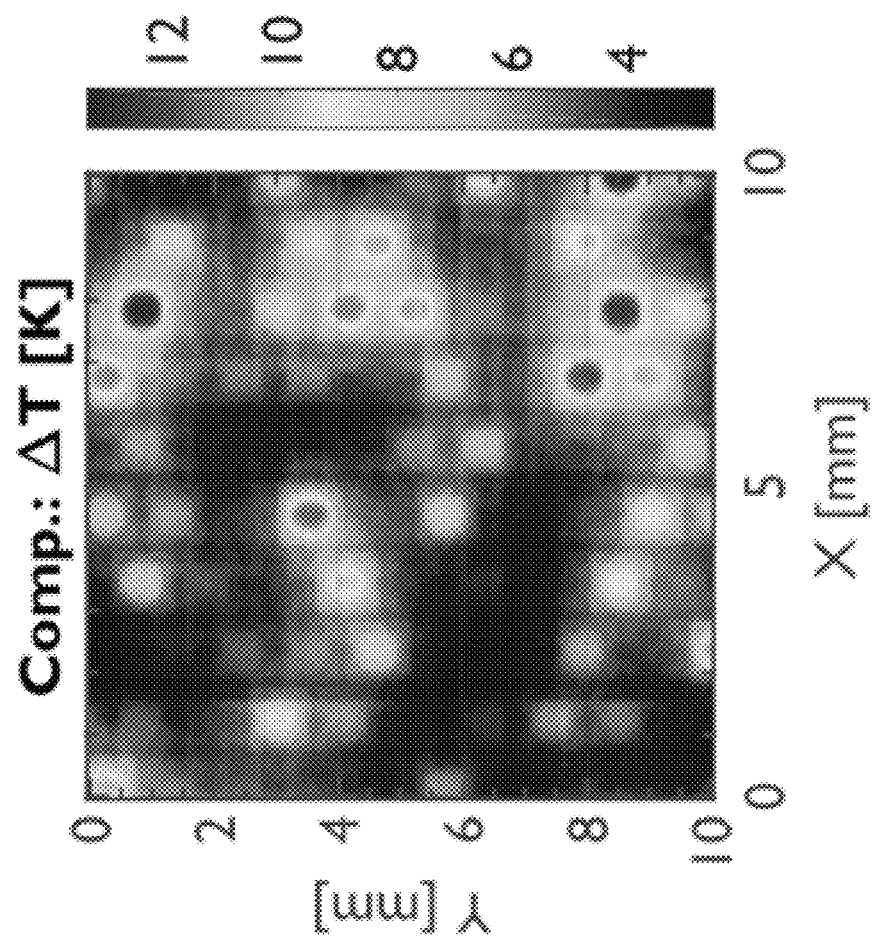
Figure 16C:
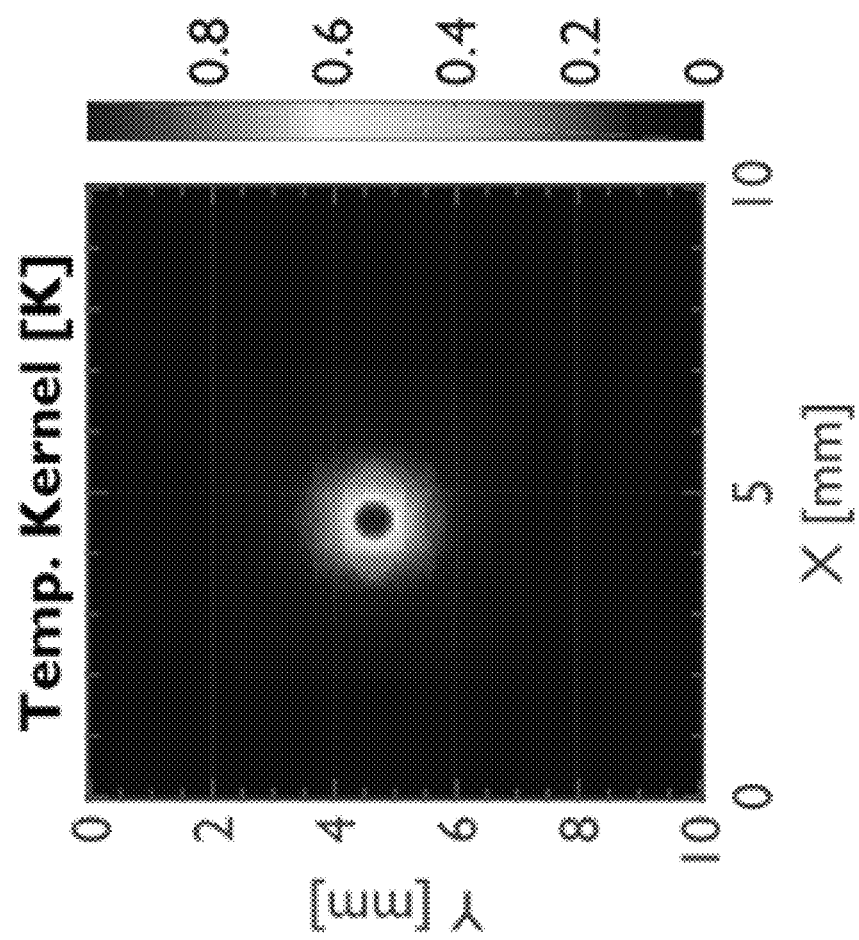
Figure 16D:
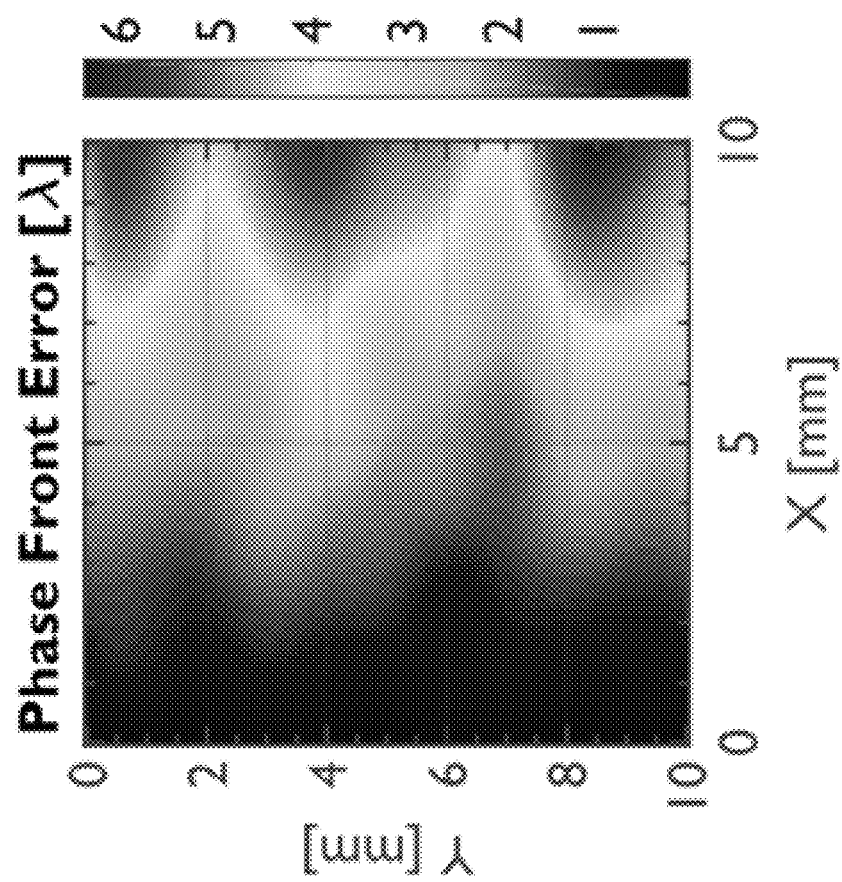
Figure 16E:
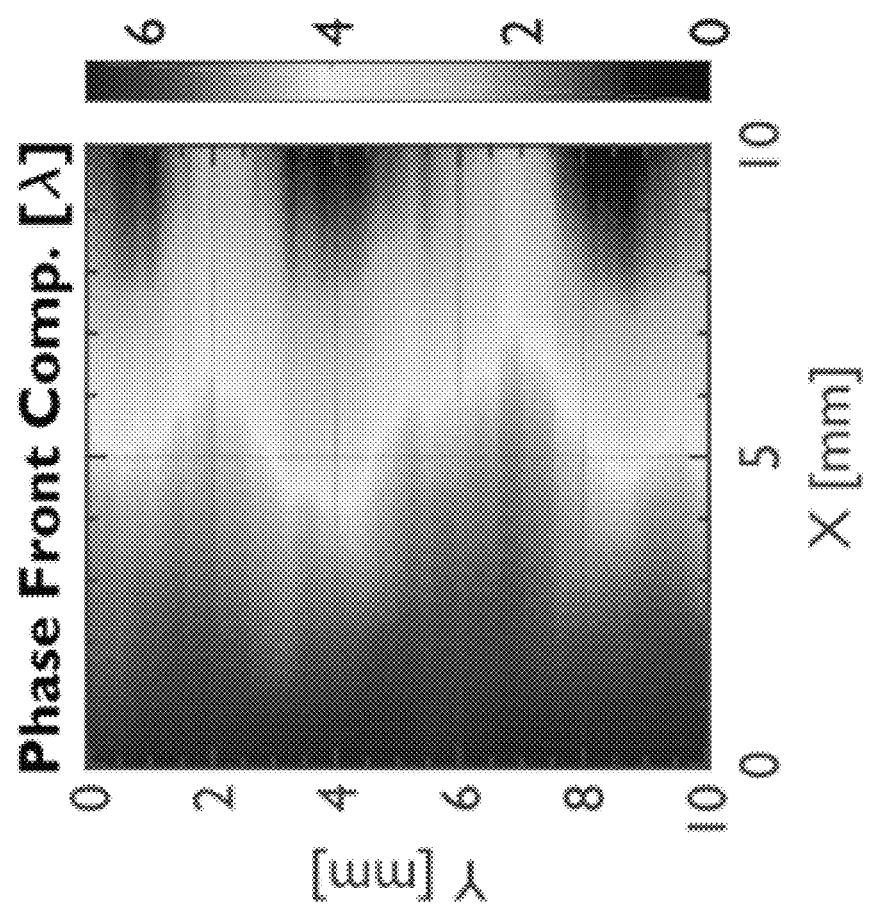
Figure 16F:
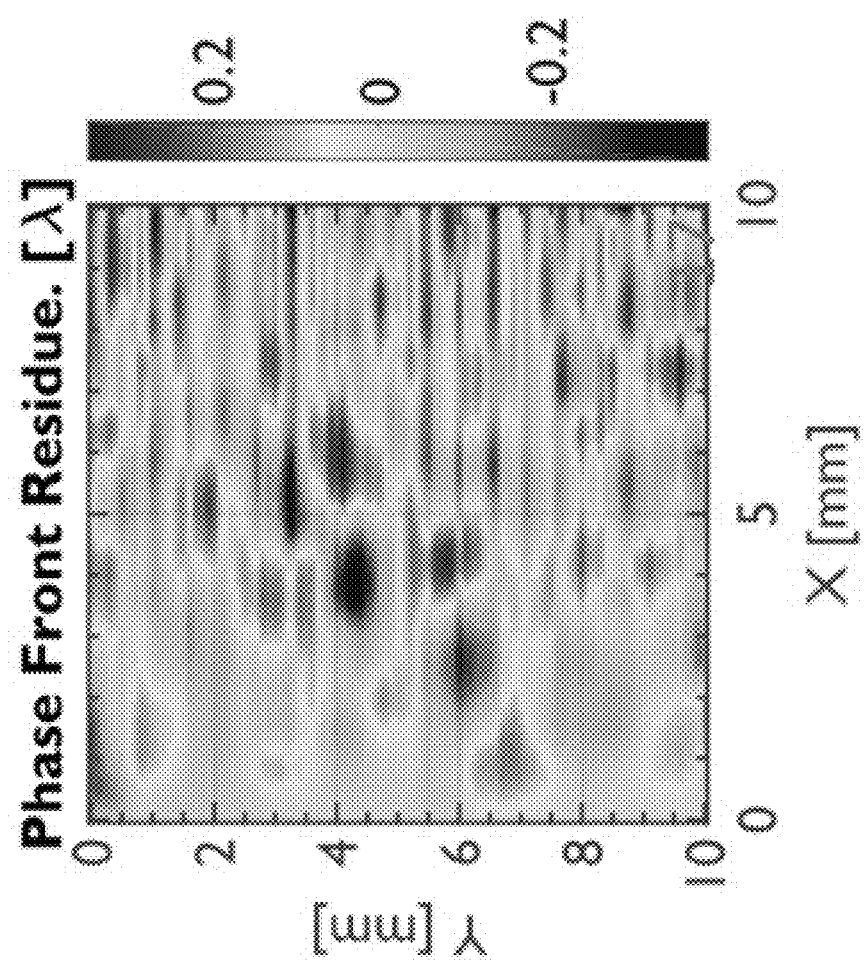

FIG. 15 is schematic diagram showing an illustrative heater array submount layout and illustrative heater (exploded) for an OPA structure including an external heater assembly to correct for OPA aberrations according to aspects of the present disclosure. Illustratively shown in the figure, a heater array submount assembly may include 50 heater elements arranged as a 5×10 array @ 1 mm pitch. Each individual heater may be constructed as a TaN resistive heater fabricated on a silica interposer. Such design advantageously provides heat profile smoothness, desirable crosstalk, and favorable operational efficiency.

Figure 17:
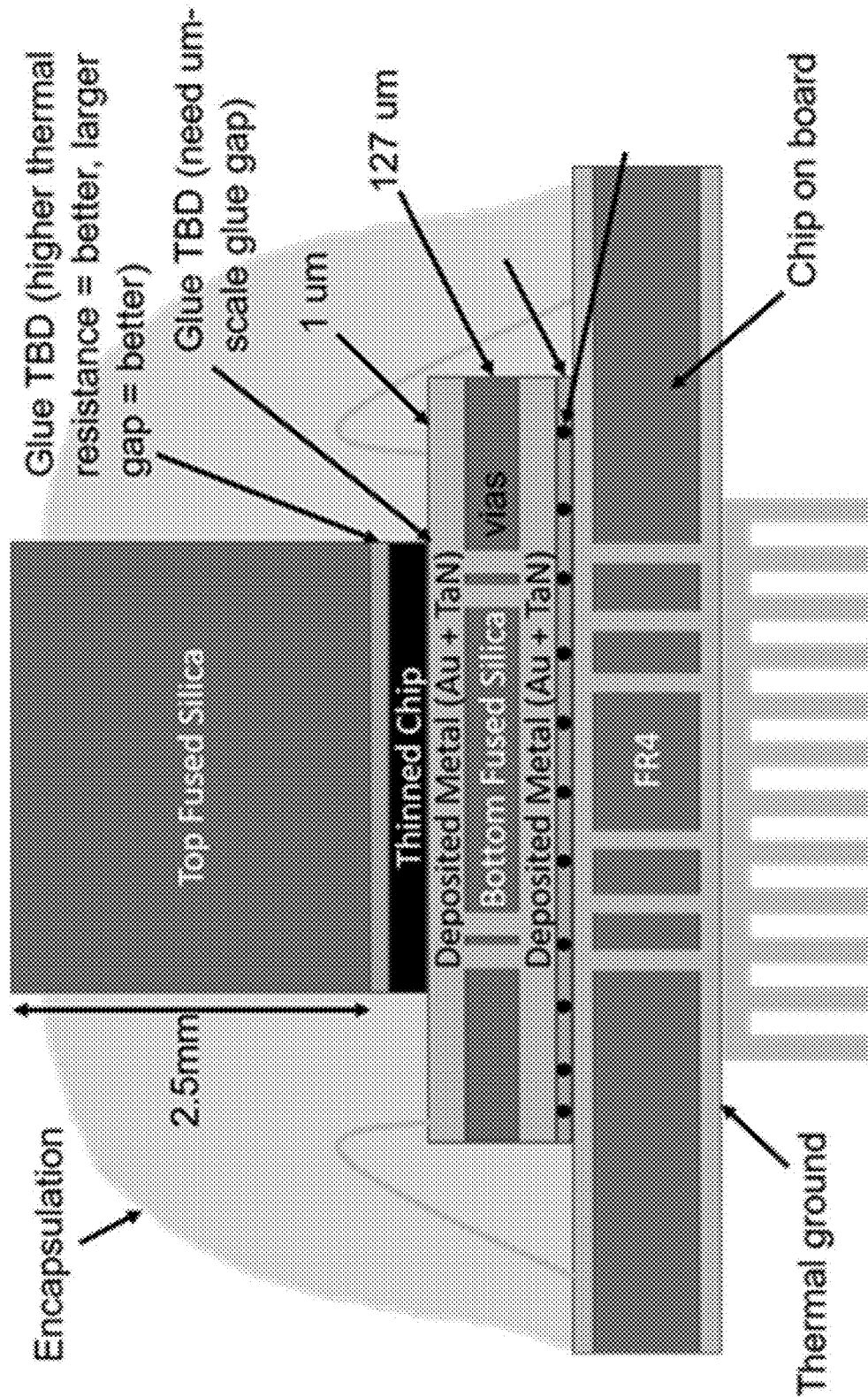
FIG. 17 is a schematic diagram showing an illustrative cross-section of a thermal stack-up including encapsulation with glue gaps calibrated to balance vertical and lateral thermal conductance according to aspects of the present disclosure.

FIG. 16(A), FIG. 16(B), FIG. 16(C), FIG. 16(D), FIG. 16(E), and FIG. 16(F) are a series of plots showing illustrative heater drive optimization utilizing particle swarm optimization of discrete heaters with FEA-derived $\Delta T$ map according to aspects of the present disclosure;

FIG. 17 is a schematic diagram showing an illustrative cross-section of a thermal stack-up including encapsulation with glue gaps calibrated to balance vertical and lateral thermal conductance according to aspects of the present disclosure. As may be appreciated, structures such as that shown in the figure may include an array of resistive heaters at mm-scale pitch fabricated on a separate sub-mount and assembled to the OPA. The stack-up is tuned to optimize a balance of vertical vs. lateral heat flows within the assembled OPA module—thereby maximizing power efficiency and to generate an optimal OPD pattern within any optically active regions.

In practice, relatively thick epoxy layers are used to "pot" the thermally active layers (actuator and OPA) and increase crosstalk to smooth the thermal profile, while a high-efficiency heat sink (that may advantageously include active cooling elements as necessary) prevents any thermal runaway.

In order to couple an external thermal element array to the OPA, the as-fabricated chip is modified. The OPA is first bonded to a window such as fused silica, sapphire, or other high-quality transparent material on its top surface, such that optical emission from the OPA is made through this window. A handle Si is optionally pre-thinned using a mechanical back-grinding process. Any remaining handle Si is removed using a selective etch process, such as $XeF_2$ vapor phase etching, reactive ion etching (including deep RIE), or chemical wet etches such as KOH or "trilogy" Si etchant, exposing the thin buried oxide layer (BOX) of the original SOI.

In this configuration, active photonic structures lie within microns of the exposed surface, and thermal adjustments made at this exposed interface will be transferred to the critical photonics with high efficiency.

Thermal adjustment elements are either monolithically microfabricated onto the exposed surface, or externally fabricated thermal adjustment parts are bonded into close contact with the exposed surface.

In a variant process, the Si handle layer may not be completely removed. Instead, a lithographic process such as Deep Reactive Ion Etching (DRIE) is used to create a pattern of isolation trenches in the thick, highly thermally conductive Si layer. These trenches define an array of heat-spreader cells, such that heat applied anywhere in a cell will spread with high uniformity within that cell but will be hindered from spreading between adjacent cells. These trenches may further define tethers or serpentine structures which form resistive heaters using the low-doped Si as a resistive material.

Thermal Profile Optimization

In an OPA—and as we have previously discussed—phase error accumulates as optical modes carried by neighboring antenna waveguides encounter varying local effective guided indices of refraction $\Delta n_{eff}$ (which may be due to variations in waveguide geometry, material properties, out-of-plane non-flatness of the chip carrying the waveguide, or external stimulus).

It is expected that variations in local index will be of a random or semi-random nature, and thus not lie on any particular grid. In contrast, the grid resolution of embedded thermal adjustment elements is limited by several factors, including fabrication constraints, driver I/O count, and power requirements scaling up with higher resolution (steeper thermal gradients in a thermally conducting or semi-insulating material require increasing power to maintain in a steady state). In one realization of this invention, the heater array consists of 1 mm×1 mm heating elements in a 5×10 grid, to correct an OPA of dimensions <=5 mm×10 mm. Thus, no matter what grid is used, the applied thermal profile will not precisely match the random index variation in the OPA.

To make use of a relatively coarse array of thermal adjustment elements to correct a random index pattern, we make use of the following principles:

"Influence function" of a single thermal element should be smooth, and extend beyond the bounds of the particular unit cell, allowing overlap. (NOTE: Reference algorithms for adaptive optics control);

Since waveguide phase error is accumulative along the propagation length, multiple heaters may partially contribute to the ultimate correction of a local aberration which is not conveniently situated at the center of the heater grid. As such there may be some imperfection in the precise local phase compared with the nominal ideal phase function for a uniform;

A uniform grid of heaters, even with a wide and smooth influence function, will tend to have "hot" and "cold" spots in cross section. Thus, an optimization is to use a grid of heaters where each column is offset from its neighbor by half the unit cell spacing, placing the "hot spot" of one heater at the same vertical coordinate as the "cold spot" of the previous heater.

These points may advantageously inform the design of the thermal unit element and the vertical thermal management material stackup.

We note that due to the crosstalk inherent to the thermal element design, optimization of thermal influence values for the actuator array requires a global optimization algorithm. As a baseline, a figure of merit for such an optimization is the global RMS phase error of the full array defined by:

$$FOM = \sqrt{\frac{1}{A}\int\int\left(\frac{\varphi}{2\pi}\right)^2 dA}.$$

Particle swarm optimization has demonstrated the ability to optimize a simulated 1 mm heater array to correct a sample simulated phase aberration based on measured fabrication data to within 0.1 wave RMS error. Other global optimization strategies can also be applied.

Heater Cell Design

According to aspects of the present disclosure, advantageously the fabrication of an array of resistive heater elements on a thin glass substrate may be accomplished using techniques common to the thin-film resistor industry. In such a process, the top side of the glass substrate is nearly entirely occupied by high-resistance heater elements (in a material such as tantalum nitride TaN) and metal elements functioning both as electrical contacts and as lateral heat spreaders. Electrical connection to the array elements is made using through-glass vias (TGVs) and a pattern of electrical traces on the bottom side of the substrate.

In addition to thermal tuning, it is desired to adjust the electrical resistance of the element for compatibility with drive electronics. For a given output heat power $P=I^2R=V^2/R$. Based on thermal simulation and the known thermo-optic coefficient of silicon, input power for a 1 mm square heater is estimated on the scale of ~30-40 mW to achieve a full wave phase shift (maximum required). The design resistance of the heater may be adjusted for voltage and current compatibility with an intended driver technology. In one implementation, a resistance value of ~200 ohms allows a drive of 2.8 VDC to source a power of ~40 mW at ~14 mA of current.

Achieving a smooth temperature profile in a DC resistively heated element typically requires a combination of higher-resistance regions and low-resistance heat spreading regions. We demonstrate a design that extends this concept to a two-dimensional heat profile, intended to approximate a pseudo-gaussian thermal influence function, based on the limitations of typical thin-film resistor manufacturing processes. In this design, a central metal element (gold in this implementation) acts as a central heat spreader and electrical connection between positive and negative resistive regions. Each resistive region is designed as a symmetric network of serpentine current paths, where cutouts designed at the minimum process feature size serve to increase resistance to the desired target value, and to steer current through a longer effective path. The design uses iterative numerical simulation to optimize the serpentine resistive paths for increased uniformity of current density and heat generation within the resistive material, which lead to increased uniformity in the final temperature profile.

Figure 18:
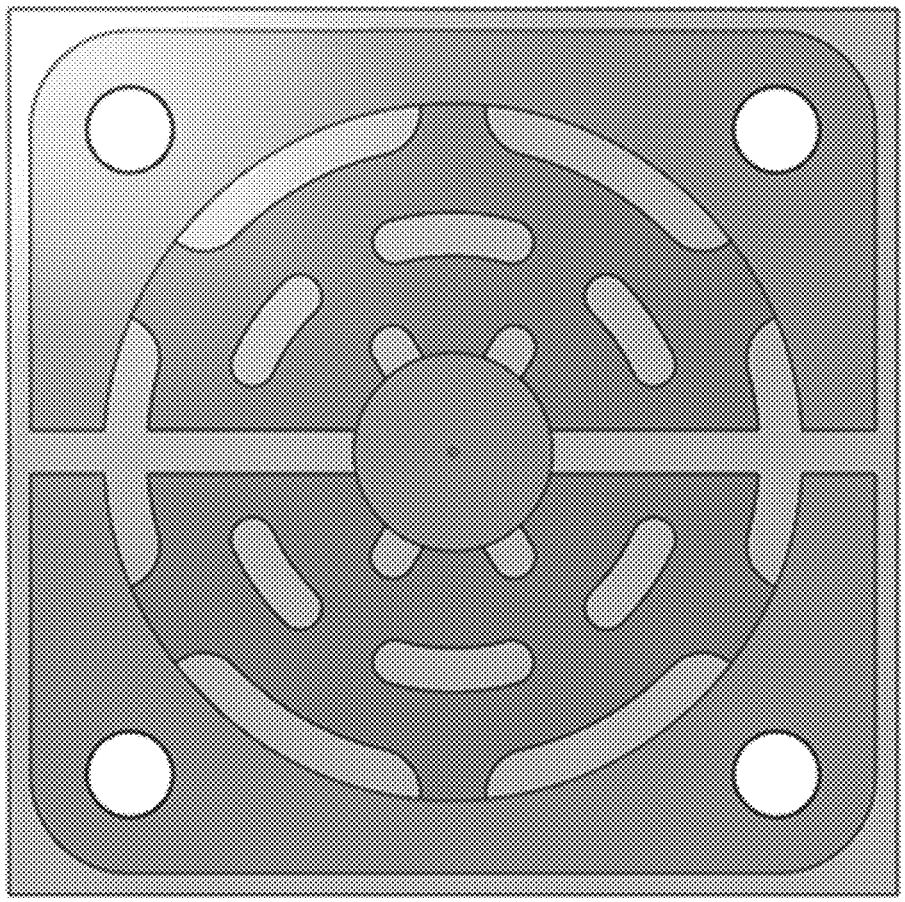
FIG. 18 is a schematic diagram showing an illustrative thin-film resistive heating element that may be employed with an OPA to correct OPA aberrations according to aspects of the present disclosure.
Figure 19:
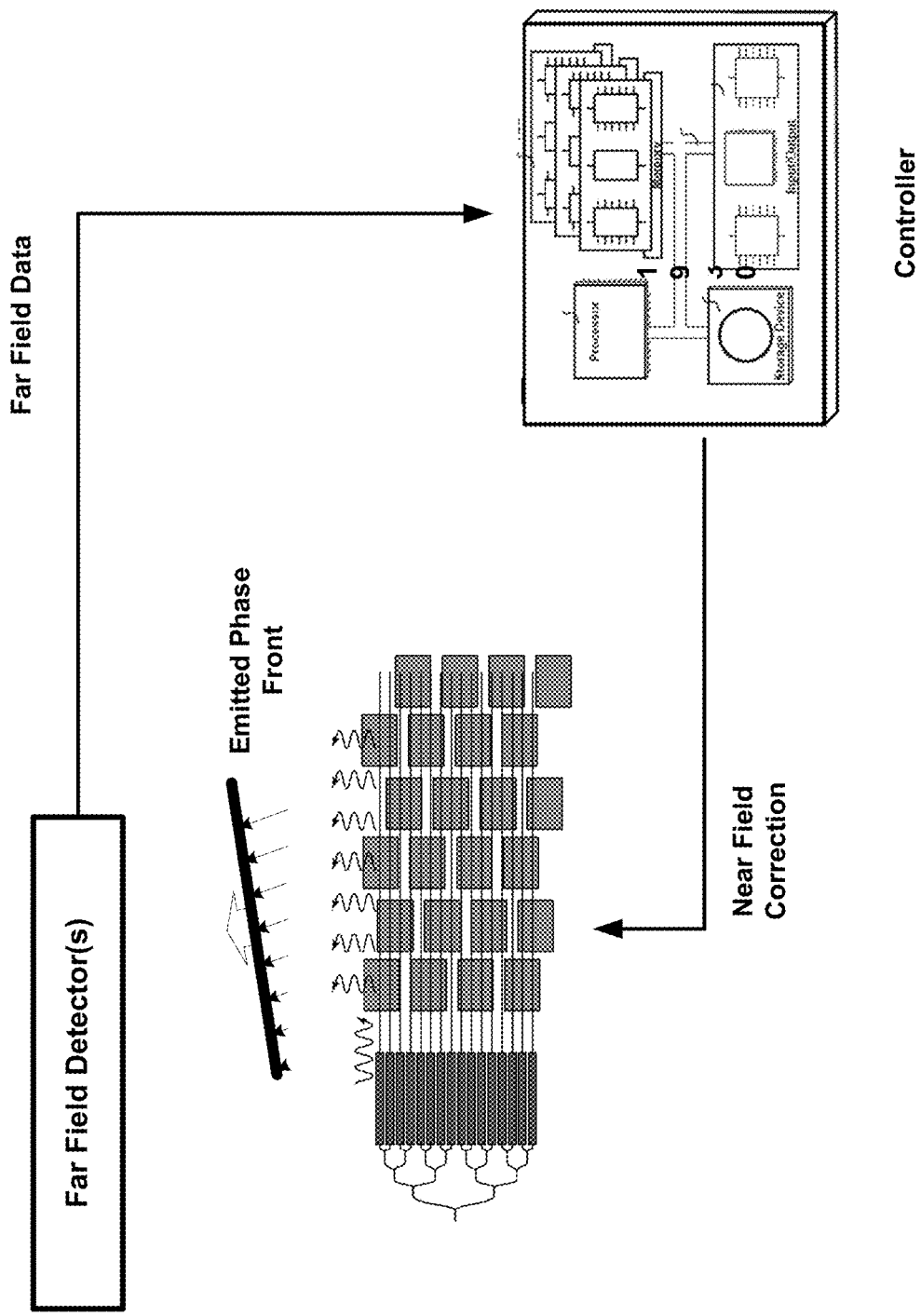
FIG. 19 is a schematic diagram showing an illustrative system including aberration corrected OPA that determines and applies a corrective prescription before and/or during operation of the OPA according to aspects of the present disclosure.

FIG. 18 is a schematic diagram showing an illustrative thin-film resistive heating element that may be employed with an OPA to correct OPA aberrations according to aspects of the present disclosure; and FIG. 19 is a schematic diagram showing an illustrative system including aberration corrected OPA that determines and applies a corrective prescription before and/or during operation of the OPA according to aspects of the present disclosure. Operationally, and as shown in that figure, an optical phased array structure including aberration corrective structures is operated such that light is emitted into a far field. Far field detector(s) detect the emitted light reaching the far field and provide signals indicative of the detected light characteristics to a controller. From that far field data, the controller determines an appropriate near field correction and applies same to the one or more aberration corrective structures such that the emissions are desirably changed. As may be readily appreciated by those skilled in the art, such an operation may proceed either intermittently during operation thereby providing an operational calibration to the structure.

Figure 20:
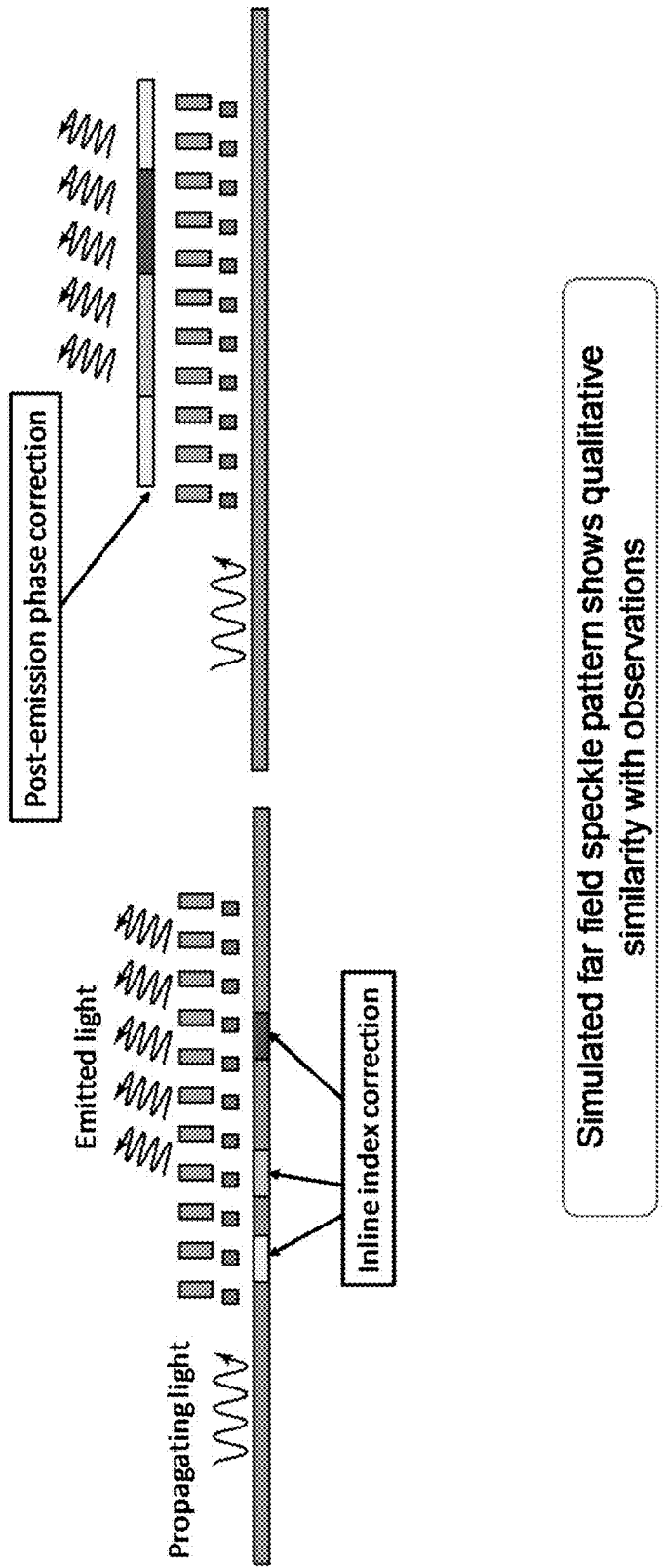
FIG. 20 is a schematic diagram illustrating inline index correction and post-emission phase correction for OPA aberrations according to aspects of the present disclosure.

FIG. 20 is a schematic diagram illustrating inline index correction and post-emission phase correction for OPA aberrations according to aspects of the present disclosure.

Figure 21:
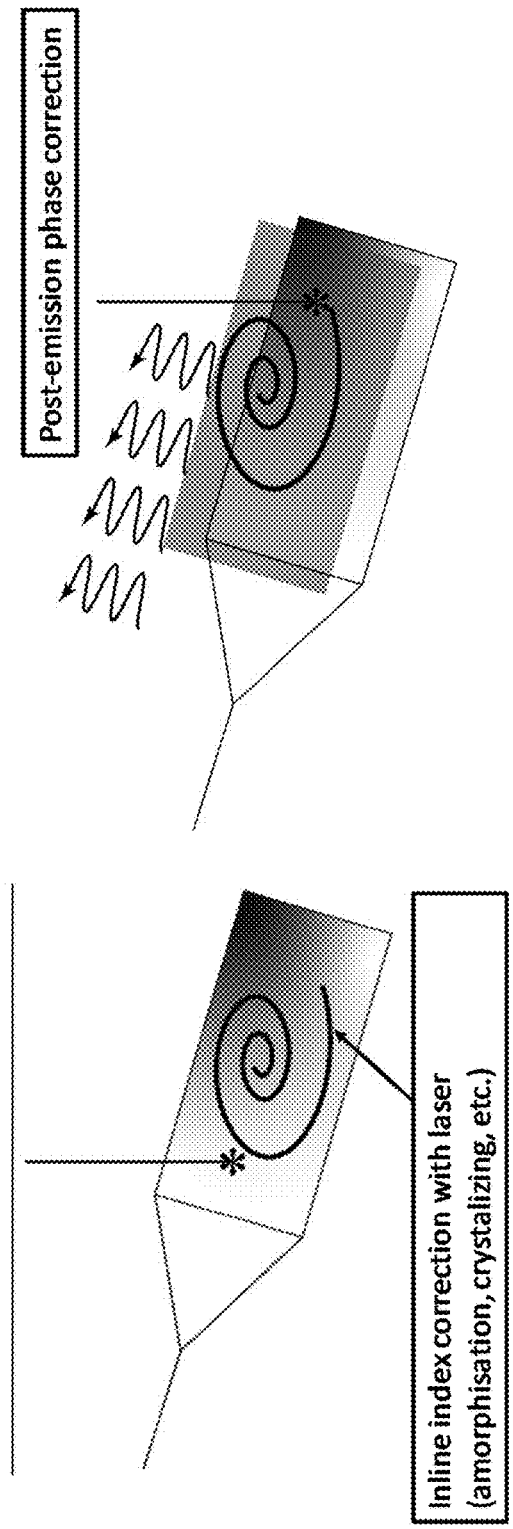
FIG. 21 is a schematic diagram illustrating the index of an optical waveguide trimmed using—for example—a laser for both inline index correction and post-emission phase correction to provide OPA aberration correction according to aspects of the present disclosure.

FIG. 21 is a schematic diagram illustrating the index of an optical waveguide trimmed using—for example—a laser for both inline index correction and post-emission phase correction to provide OPA aberration correction according to aspects of the present disclosure.

We note at this point that the index of an optical waveguide can be trimmed in a way that the light traveling through the waveguides and emitting through the aperture will experience equal (to close to equal) phase when emitted from the length of all waveguides across the width and length of the aperture. At each wavelength the steering angle of the aperture can change but when observed from the targeted emission angle the phase front of the whole aperture should be flat at zero (±2 pi).

One permanent method of trimming the phase is correcting for the index variations along the waveguide. By employing a method that locally changes the effective index of the waveguide, all of the waveguides across the aperture can be brought to an equal effective index across the aperture.

For example, if laser exposure changes the local material index of the waveguide material (or a layer in its proximity) by controlling the intensity of laser light when scanned across the aperture the effective index of the waveguides can be brought to a uniform minimum or maximum depending on the effect of the laser on the material. For example, if the laser breaks down the crystalline structure of the material it can reduce the local refractive index. Alternatively, laser exposure can crystalize an already amorphous material and increase/decrease its refractive index. Both the intensity of the laser, the exposure time, pulse repetition, pulse duration or a combination of the above can be utilized to control the dosage of the light intensity applied for the exposure process. The index versus light intensity of exposure can have a nonlinear curve and the change in index as a function of light exposure and field intensity should be carefully characterized.

Figure 22:
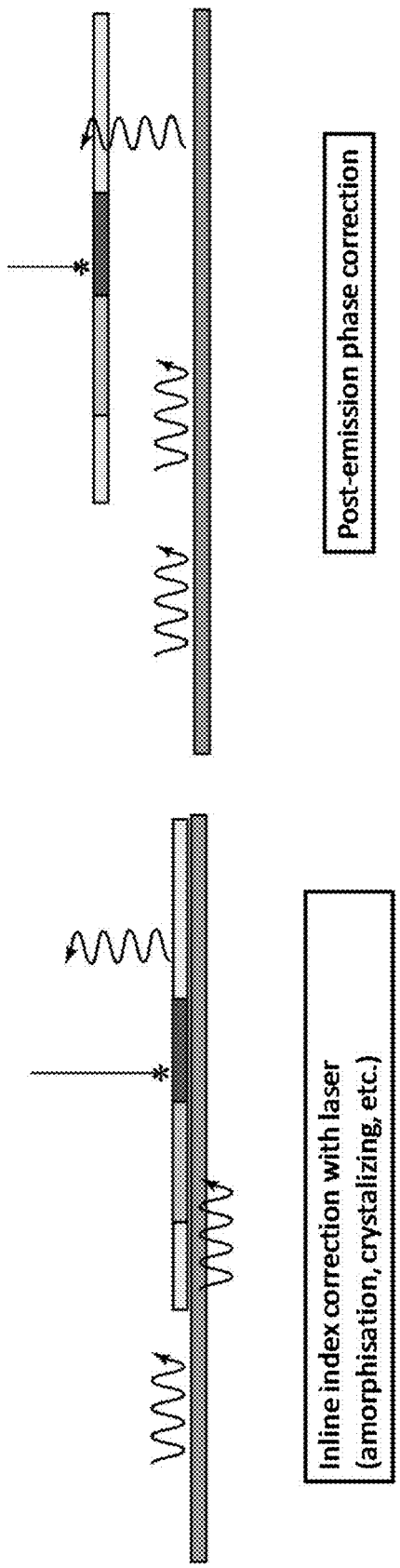
FIG. 22 is a schematic diagram illustrating inline index correction with laser (amorphization, crystalizing, etc.) and post-emission phase correction to provide OPA aberration correction according to aspects of the present disclosure.

FIG. 22 is a schematic diagram illustrating inline index correction with laser (amorphization, crystalizing, etc.) and post-emission phase correction to provide OPA aberration correction according to aspects of the present disclosure.

Figure 23:
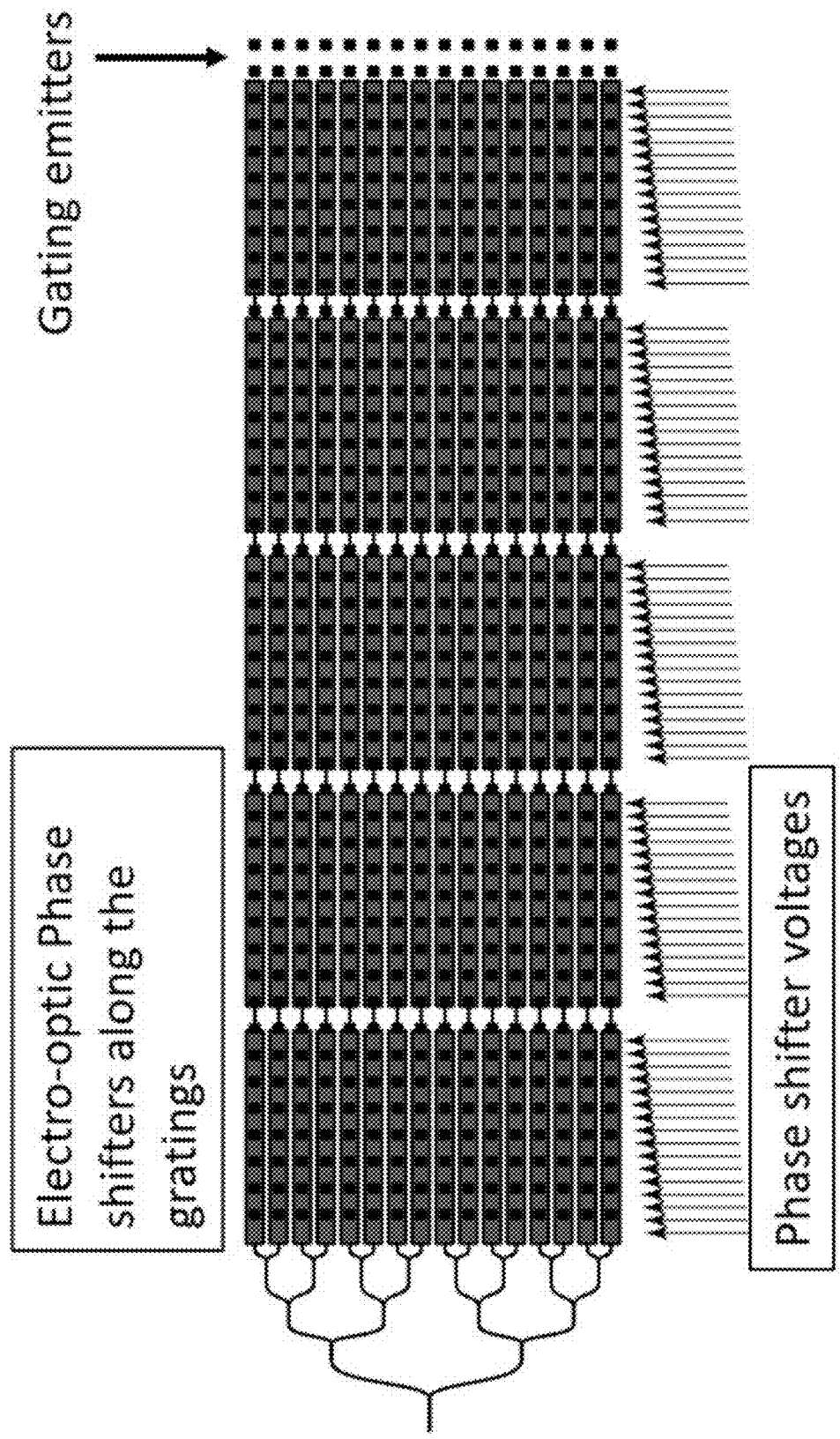
FIG. 23 is a schematic diagram illustrating an OPA structure including electro-optic phase shifters positioned along the waveguides/gratings according to aspects of the present disclosure.
Figure 24A:
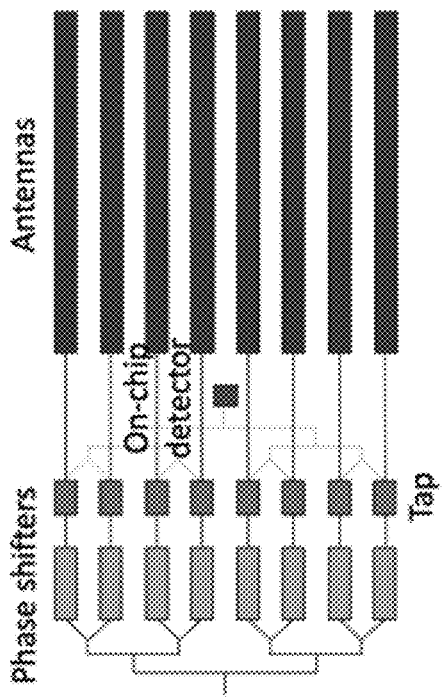
FIG. 24(A), FIG. 24(B), FIG. 24(C), and FIG. 24(D) is series of schematic diagrams illustrating an OPA structure and detector arrangements according to aspects of the present disclosure.
Figure 24B:
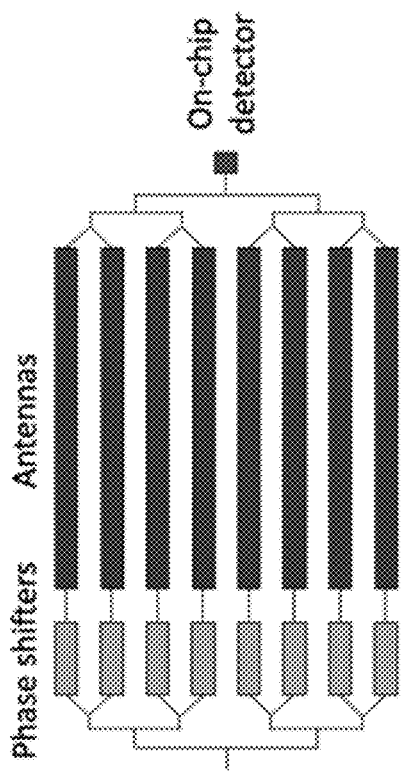
Figure 24C:
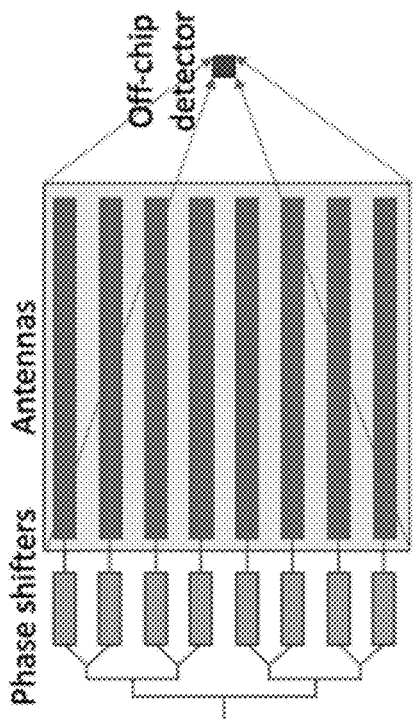
Figure 24D:
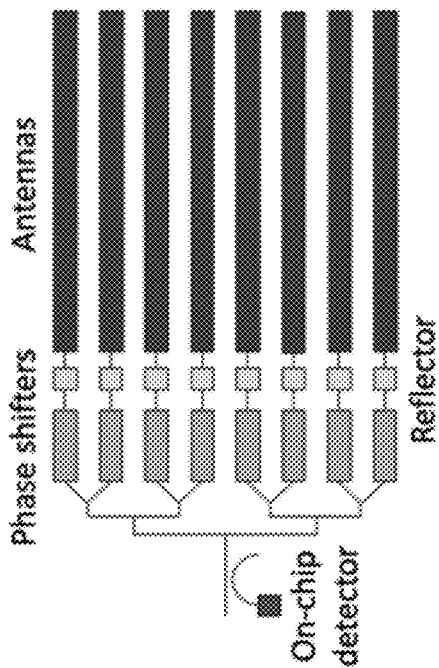

FIG. 23 is a schematic diagram illustrating an OPA structure including electro-optic phase shifters positioned along the waveguides/gratings according to aspects of the present disclosure.

FIG. 24(A), FIG. 24(B), FIG. 24(C), and FIG. 24(D) is series of schematic diagrams illustrating an OPA structure and detector arrangements according to aspects of the present disclosure.

Figure 25:
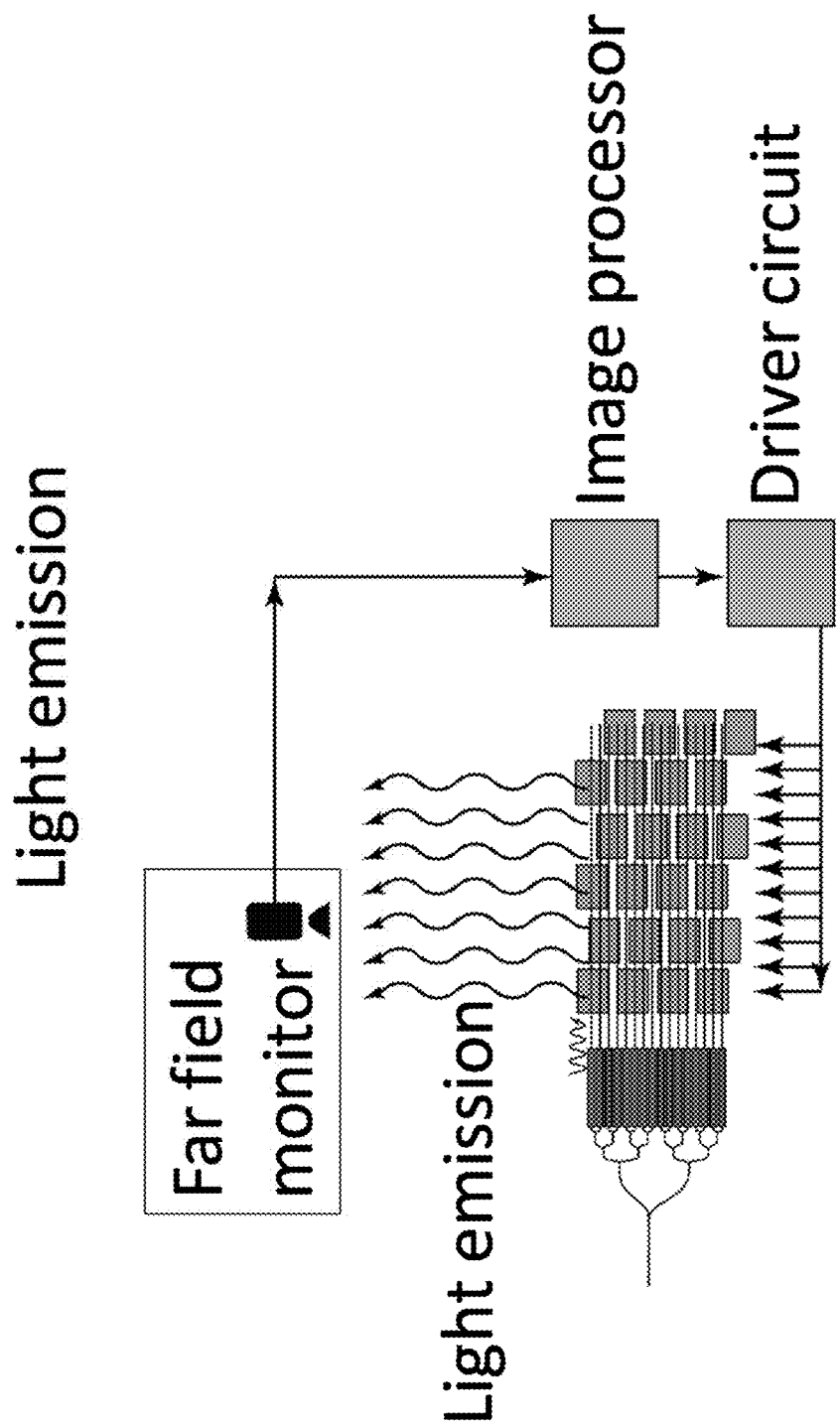
FIG. 25 is a schematic diagram illustrating an additional arrangement for determining amount of correction to apply to an OPA structure to provide aberration corrections according to aspects of the present disclosure.

FIG. 25 is a schematic diagram illustrating an additional arrangement for determining amount of correction to apply to an OPA structure to provide aberration corrections according to aspects of the present disclosure.

Figure 26:
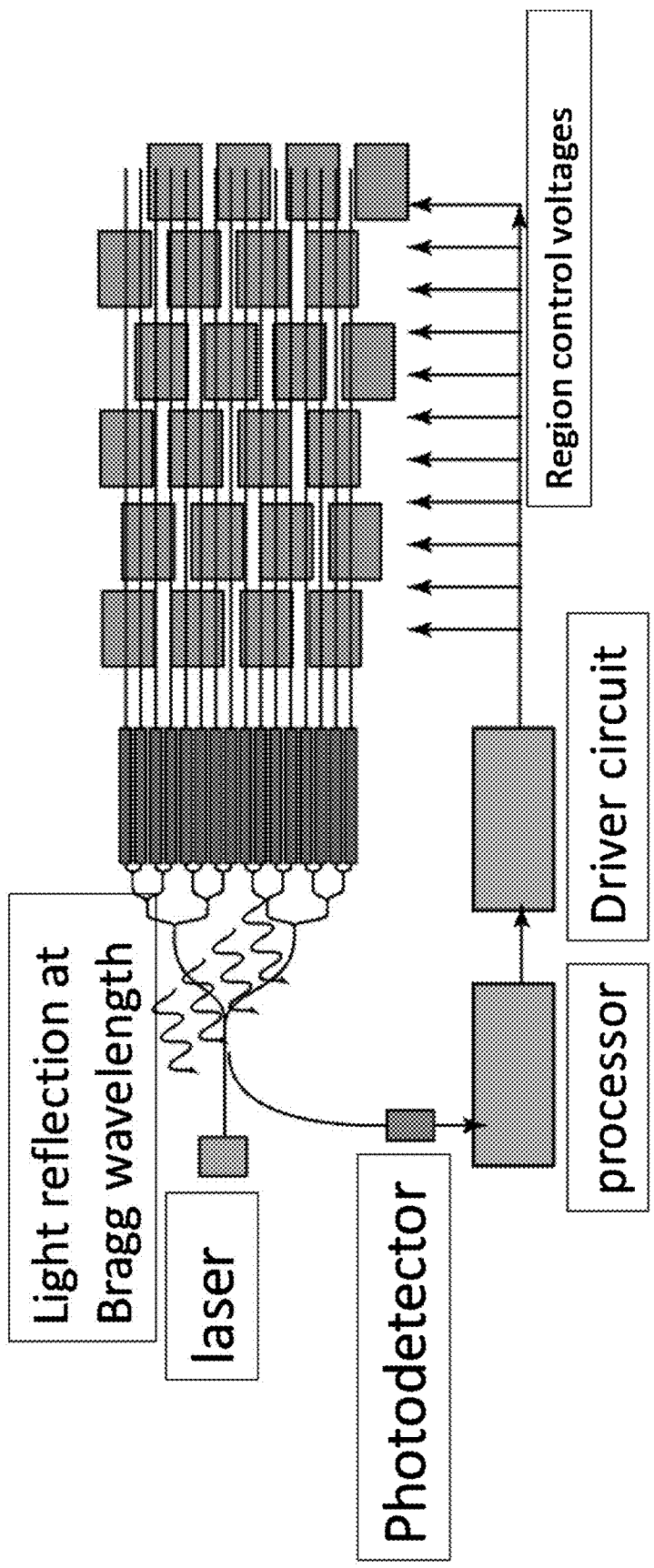
FIG. 26 is a schematic diagram illustrating an additional arrangement utilizing light reflected at Bragg wavelength for determining amount of correction to apply to an OPA structure including sub-apertures (regions) to provide aberration corrections according to aspects of the present disclosure The illustrative embodiments are described more fully by the Figures and detailed description. Embodiments according to this disclosure may, however, be embodied in various forms and are not limited to specific or illustrative embodiments described in the drawing and detailed description.

FIG. 26 is a schematic diagram illustrating an additional arrangement utilizing light reflected at Bragg wavelength for determining amount of correction to apply to an OPA structure including sub-apertures (regions) to provide aberration corrections according to aspects of the present disclosure At this point, while we have presented this disclosure using some specific examples, those skilled in the art will recognize that our teachings are not so limited. Accordingly, this disclosure should be only limited by the scope of the claims attached hereto.

The invention claimed is:

1. An optical phased array (OPA) structure comprising:
an array of optical antennas that emit light, said array of antennas defining an overall aperture of the OPA; and
a phase corrector configured to apply at least one of: (1) a spatially-varying optical path difference (OPD) across the overall aperture of the OPA, where the spatially-varying OPD is substantially equal and opposite to an equivalent OPD that would cause any far-field beam aberrations, or (2) a spatially-varying optical phase shift across the overall aperture of the OPA, where the spatially-varying optical phase shift is substantially equal and opposite to an equivalent optical phase shift that would cause any far-field beam aberrations;
wherein the overall aperture of the OPA is arranged as a plurality of sub-apertures, and the phase corrector comprises a plurality of index-controlling elements underlying the OPA structure, each one of the index-controlling elements associated with a particular sub-aperture, and each one of the index-controlling elements operable to adjust at least one of the OPD or optical phase shift of the sub-aperture to which it is associated.

2. The OPA structure of claim 1 wherein:
the plurality of index-controlling elements comprise a plurality of individually operable heater elements in thermal communication with the overall aperture.

3. The OPA structure of claim 1 wherein:
the plurality of index-controlling elements comprise a plurality of individually operable electrodes positioned within the overall aperture.

4. The OPA structure of claim 1 further comprising:
a plurality of individually operable phase shifters positioned outside of the overall aperture, each one of the phase shifters positioned in an optical path at the entrance to an optical waveguide, said waveguide including a plurality of antennae, wherein at least one antenna of the plurality of antennae is positioned in a different sub-aperture from another antenna of the same waveguide.

5. The OPA structure of claim 2 wherein:
a change in at least one of OPD or optical phase shift of antennae associated with a particular sub-aperture occurs when the heater element associated with that particular sub-aperture is activated.

6. The OPA structure of claim 3 wherein:
a change in at least one of OPD or optical phase shift of antennae associated with a particular sub-aperture occurs when a voltage is applied to the electrode associated with that particular sub-aperture.

7. The OPA structure of claim 1 wherein:
at least two of the antennae share a common waveguide, each one of the two antennae associated with a different sub-aperture, wherein at least one of the index-controlling elements is positioned intermediate to the two antennae.

8. The OPA structure of claim 1 wherein:
the plurality of index-controlling elements comprise a plurality of electrodes underlying the OPA structure on a surface opposite to an OPA surface including the antennae.

9. A method for aberration correction of an optical phased array (OPA), the method comprising:
operating the optical phased array such that light is emitted into a far-field of the OPA;
detecting the far-field light;
determining, from the detected far-field light, OPA aberrations; and
applying using a phase corrector, from the determined OPA aberrations, at least one of:
(1) a spatially-varying optical path difference (OPD) across an overall aperture of the OPA, or (2) a spatially-varying optical phase shift across the overall aperture of the OPA;
wherein the overall aperture of the OPA is arranged as a plurality of sub-apertures, and the phase corrector comprises a plurality of index-controlling elements underlying the OPA, each one of the index-controlling elements associated with a particular sub-aperture, and each one of the index-controlling elements adjusting at least one of the OPD or optical phase shift of the sub-aperture to which it is associated.

10. The method of claim 9 wherein:
the plurality of index-controlling elements comprise a plurality of individually operable electrodes positioned within the overall aperture, and the applied OPD or optical phase shift is effected by application of a voltage to one or more of the individually operable electrodes.

11. The method of claim 9 wherein:
the plurality of index-controlling elements comprise a plurality of individually operable heater elements positioned within the OPA, and the applied OPD or optical phase shift is effected by activation of one or more of the individually operable heater elements.

12. A method for aberration correction of an optical phased array (OPA), the method comprising:
determining any variations in characteristics of waveguides comprising the OPA;
determining from the determined variations in waveguide characteristics a spatially-varying optical path difference (OPD) or a spatially-varying optical phase shift to be applied to sub-apertures within an overall aperture of the OPA such that a predetermined far-field emission pattern of the OPA is achieved; and
applying the spatially-varying OPD or optical phase shift to the aperture using a plurality of index-controlling elements underlying the OPA, each one of the index-controlling elements associated with a particular sub-aperture, and each one of the index-controlling elements operable to adjust at least one of the OPD or optical phase shift of the sub-aperture to which it is associated.

13. The method of claim 12 wherein:
the plurality of index-controlling elements comprise a plurality of heater elements in thermal communication with particular ones of the plurality of waveguides.

14. The method of claim 12 wherein:
the plurality of index-controlling elements include at least one index-controlling element positioned intermediate to a pair of antenna emitter structures in optical communication with a particular one of the plurality of waveguides.

15. The OPA structure of claim 1 wherein:
at least one of the index-controlling elements is configured to induce a spatially-varying index of a waveguide in optical communication with one or more of the antennas.

16. The OPA structure of claim 15 wherein:
the index-controlling element induces the spatially-varying index by breaking down a crystalline structure of a material of the waveguide or a material in proximity to the waveguide, or by crystalizing an amorphous material of the waveguide or a material in proximity to the waveguide.

17. The method of claim 9 wherein:
at least one of the OPD or optical phase shift adjusted by one or more of the index-controlling elements comprises a spatially-varying index of a waveguide in optical communication with one or more antennas of an array of optical antennas providing the emitted light.

18. The method of claim 17 wherein:
applying the spatially-varying index comprises breaking down a crystalline structure of a material of the waveguide or a material in proximity to the waveguide, or crystalizing an amorphous material of the waveguide or a material in proximity to the waveguide.

19. The method of claim 12 wherein determining any variations in characteristics of waveguides comprising the OPA comprises: measuring resonance frequencies associated with optical resonators positioned in proximity to optical antennas at locations along the waveguides.

* * * * *